United States Patent
Soltani et al.

(10) Patent No.: US 12,255,683 B2
(45) Date of Patent: Mar. 18, 2025

(54) DIRECT CURRENT (DC) BIAS AND ALTERNATING CURRENT (AC) POWER SELECTION SIGNALING FOR OPTICAL WIRELESS COMMUNICATIONS

(71) Applicant: QUALCOMM Incorporated, San Diego, CA (US)

(72) Inventors: Morteza Soltani, San Diego, CA (US); Yisheng Xue, San Diego, CA (US); Jing Sun, San Diego, CA (US); Xiaoxia Zhang, San Diego, CA (US); Karoly Becze, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 18/181,446

(22) Filed: Mar. 9, 2023

(65) Prior Publication Data
US 2024/0305371 A1    Sep. 12, 2024

(51) Int. Cl.
  *H04B 10/11* (2013.01)
  *H04B 10/80* (2013.01)
  *H04W 52/08* (2009.01)

(52) U.S. Cl.
  CPC ............. *H04B 10/11* (2013.01); *H04B 10/80* (2013.01); *H04W 52/08* (2013.01)

(58) Field of Classification Search
  CPC ........ H04B 10/11; H04B 10/80; H04W 52/08
  USPC ...................................................... 398/130
  See application file for complete search history.

(56) References Cited

U.S. PATENT DOCUMENTS

| | | | |
|---|---|---|---|
| 12,034,478 B2* | 7/2024 | Csonka | H04B 10/11 |
| 2018/0254826 A1* | 9/2018 | Jungnickel | H04B 10/1149 |
| 2022/0271845 A1* | 8/2022 | Kirrbach | H04B 10/64 |
| 2024/0171272 A1* | 5/2024 | Rojas Calvente | H04B 10/1143 |

OTHER PUBLICATIONS

Deng P., et al., "Effect of White LED DC-bias on Modulation Speed for Visible Light Communications", Arxiv.Org, Computer Science & Information Theory, Dec. 27, 2016, 11 Pages.
Edmunds C., et al., "Modulation of Light", Journal of Electronic Materials, Purdue Physics, vol. 41, No. 881, 2012, 48 pages.
Zhao W., et al., "Modulation Bandwidth Enhancement of Monolithically Integrated Mutually Coupled Distributed Feedback Laser", Applied Sciences, May 2020, vol. 10, No. 12, 13 Pages, DOI: 10.3390/U.S. Appl. No. 10/124,375.

* cited by examiner

*Primary Examiner* — Dalzid E Singh
(74) *Attorney, Agent, or Firm* — Procopio, Cory, Hargreaves & Savitch LLP

(57) ABSTRACT

In an aspect, an OWC transmitter transmits, to an OWC receiver, a first DC bias parameter, receives, from the OWC receiver, DC bias feedback based on a measurement associated with an OWC link between the OWC transmitter and the OWC receiver, and transmits an OWC signal with a second DC bias parameter that is based on the DC bias feedback from the OWC receiver. In another aspect, an OWC receiver receives, from an OWC transmitter, a first DC bias parameter, transmits DC bias feedback based on a measurement associated with an OWC link between the OWC transmitter and the OWC receiver, and receives, from the OWC transmitter, an OWC signal having a second DC bias parameter based on the DC bias feedback.

30 Claims, 14 Drawing Sheets

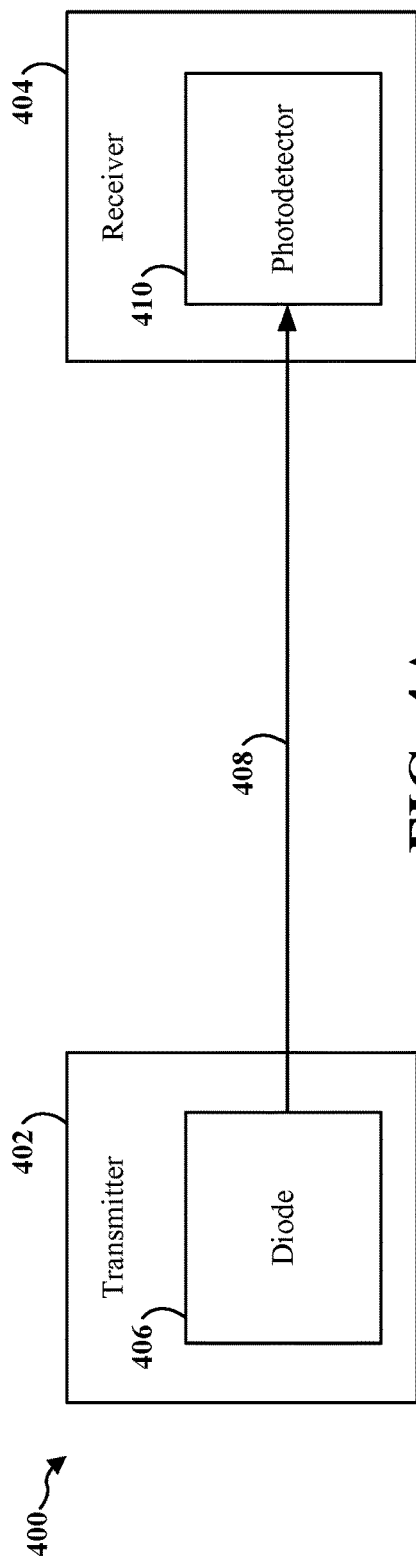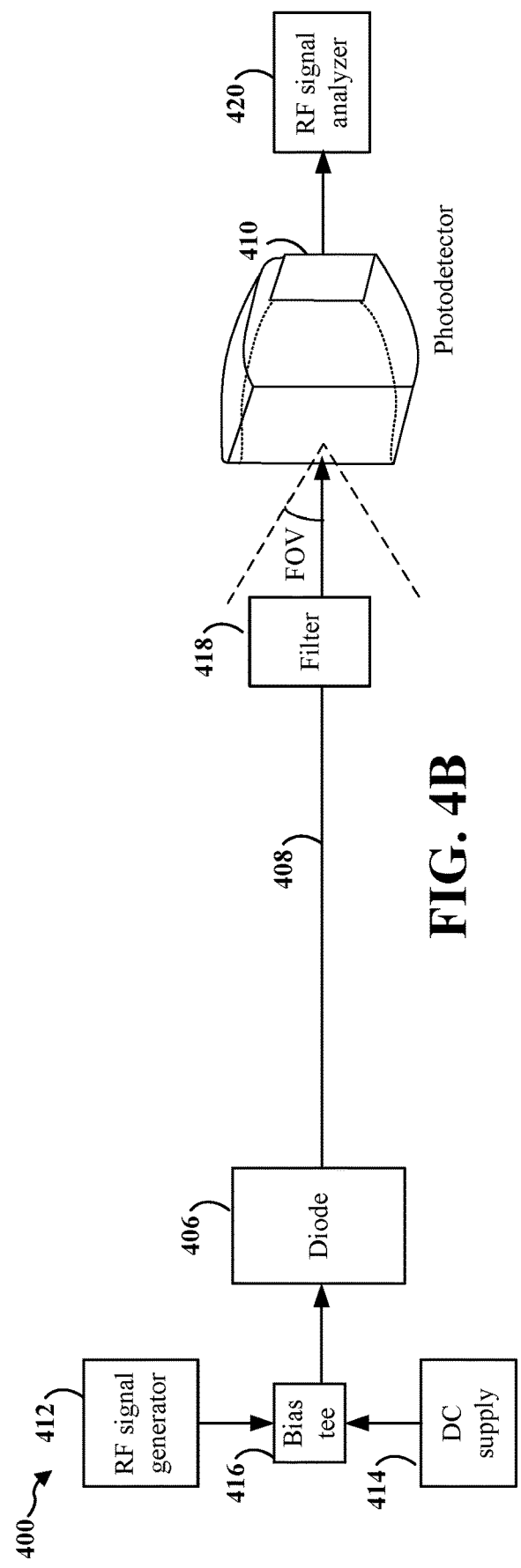
FIG. 4A
FIG. 4B

| | RF BW (MHz) | AC TX power (dBm) | LD DC Bias Current (mA) |
|---|---|---|---|
| Link1 | 20 | -10.0 | 60 |
| Link2 | 20 | 0.0 | 60 |
| Link3 | 20 | 0.0 | 90 |

DIRECT CURRENT (DC) BIAS AND ALTERNATING CURRENT (AC) POWER SELECTION SIGNALING FOR OPTICAL WIRELESS COMMUNICATIONS

TECHNICAL FIELD

The present disclosure relates generally to communication systems, and more particularly, to optical wireless communications (OWC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include memory and at least one processor coupled to the memory. Based at least in part on information stored in the memory, the at least one processor may be configured to transmit, to an OWC receiver, a first direct current (DC) bias parameter. The apparatus may be further configured to receive, from the OWC receiver, DC bias feedback based on a measurement associated with an OWC link between the OWC transmitter and the OWC receiver. The apparatus may be further configured to transmit an OWC signal with a second DC bias parameter that is based on the DC bias feedback from the OWC receiver.

In another aspect of the disclosure, a method, a computer-readable medium, and an apparatus are provided. The apparatus may include memory and at least one processor coupled to the memory. Based at least in part on information stored in the memory, the at least one processor may be configured to receive, from an OWC transmitter, a first DC bias parameter. The apparatus may be further configured to transmit DC bias feedback based on a measurement associated with an OWC link between the OWC transmitter and the OWC receiver, and receive, from the OWC transmitter, an OWC signal having a second DC bias parameter based on the DC bias feedback.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A and FIG. 4B illustrate diagrams of an OWC link in accordance with various aspects of the present disclosure.

DETAILED DESCRIPTION

Figure 1:
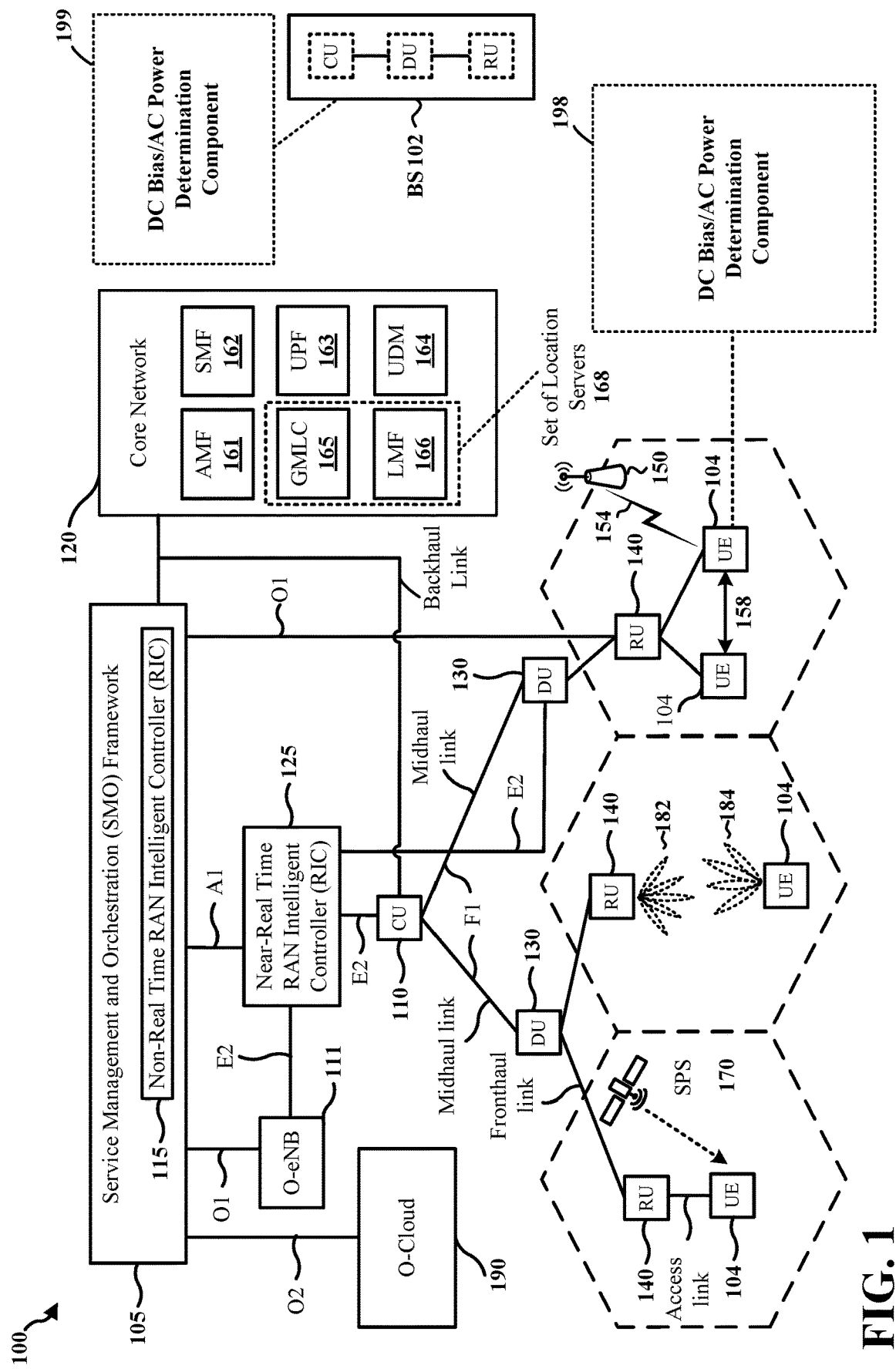
FIG. 1 is a diagram illustrating an example of a wireless communications system and an access network.

Various aspects relate generally to wireless communication and particularly to optical wireless communications (OWC). Some aspects more specifically relate to determining optimal operating characteristics or conditions (e.g., an optimal DC bias and/or an optimal alternating current (AC) power) for an OWC transmitter and an OWC receiver to optimize a link therebetween. In some examples, the OWC transmitter may initially select a DC bias and/or AC power (e.g., a default DC bias and/or AC power) to optimize its own transmission performance and signal the selected DC bias and/or AC power and/or an optimal DC bias range and/or AC power range to the OWC receiver. The OWC receiver may evaluate the selected DC bias and/or AC power range to determine how well the OWC receiver performs using the selected DC bias and/or AC power (e.g., in terms of shot noise) and may make a recommendation on a refined DC bias range and/or AC power range to the OWC transmitter. The OWC transmitter may select a DC bias and/or AC power from the refined DC bias range and/or refined AC power range based on the recommendation of the OWC receiver.

Particular aspects of the subject matter described in this disclosure can be implemented to realize one or more of the following potential advantages. In some examples, by utilizing a DC bias and/or AC power from the refined DC bias range and/or refined AC power range recommended by the OWC receiver, the described techniques ensure that OWC signals transmitted by the OWC transmitter result in relatively low shot noise and also drive the photodetector of the OWC receiver in its linear region, thereby avoiding nonlinear distortion and reducing the degradation of the OWC signal link.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming.

The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a DC bias/AC power determination component 198 that may be configured to transmit, to an OWC receiver, a first DC bias parameter; to receive, from the OWC receiver, DC bias feedback based on a measurement associated with an OWC link between the OWC transmitter and the OWC receiver; and to transmit an OWC signal with a second DC bias parameter that is based on the DC bias feedback from the OWC receiver. In certain aspects, the DC bias/AC power determination component 198 may be configured to receive, from an OWC transmitter, a first DC bias parameter; to transmit DC bias feedback based on a measurement associated with an OWC link between the OWC transmitter and the OWC receiver; and to receive, from the OWC transmitter, an OWC signal having a second DC bias parameter based on the DC bias feedback. In certain aspects, the base station 102 may have a DC bias/AC power determination component 199 that may be configured to transmit, to an OWC receiver, a first DC bias parameter; to receive, from the OWC receiver, DC bias feedback based on a measurement associated with an OWC link between the OWC transmitter and the OWC receiver; and to transmit an OWC signal with a second DC bias parameter that is based on the DC bias feedback from the OWC receiver. In certain aspects, the DC bias/AC power determination component 199 may be configured to receive, from an OWC transmitter, a first DC bias parameter; to transmit DC bias feedback based on a measurement associated with an OWC link between the OWC transmitter and the OWC receiver; and to receive, from the OWC transmitter, an OWC signal having a second DC bias parameter based on the DC bias feedback.

Figure 2:
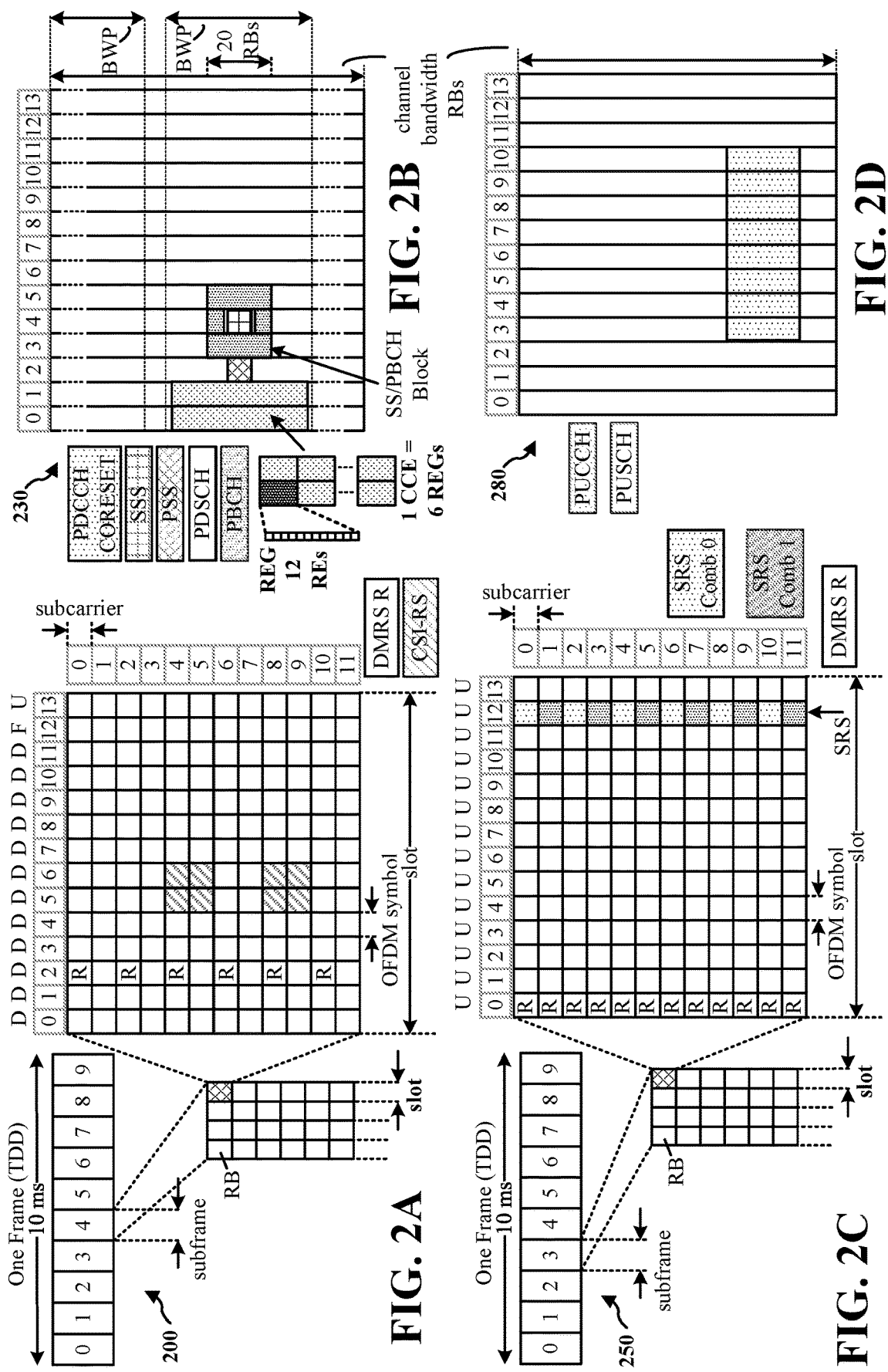
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
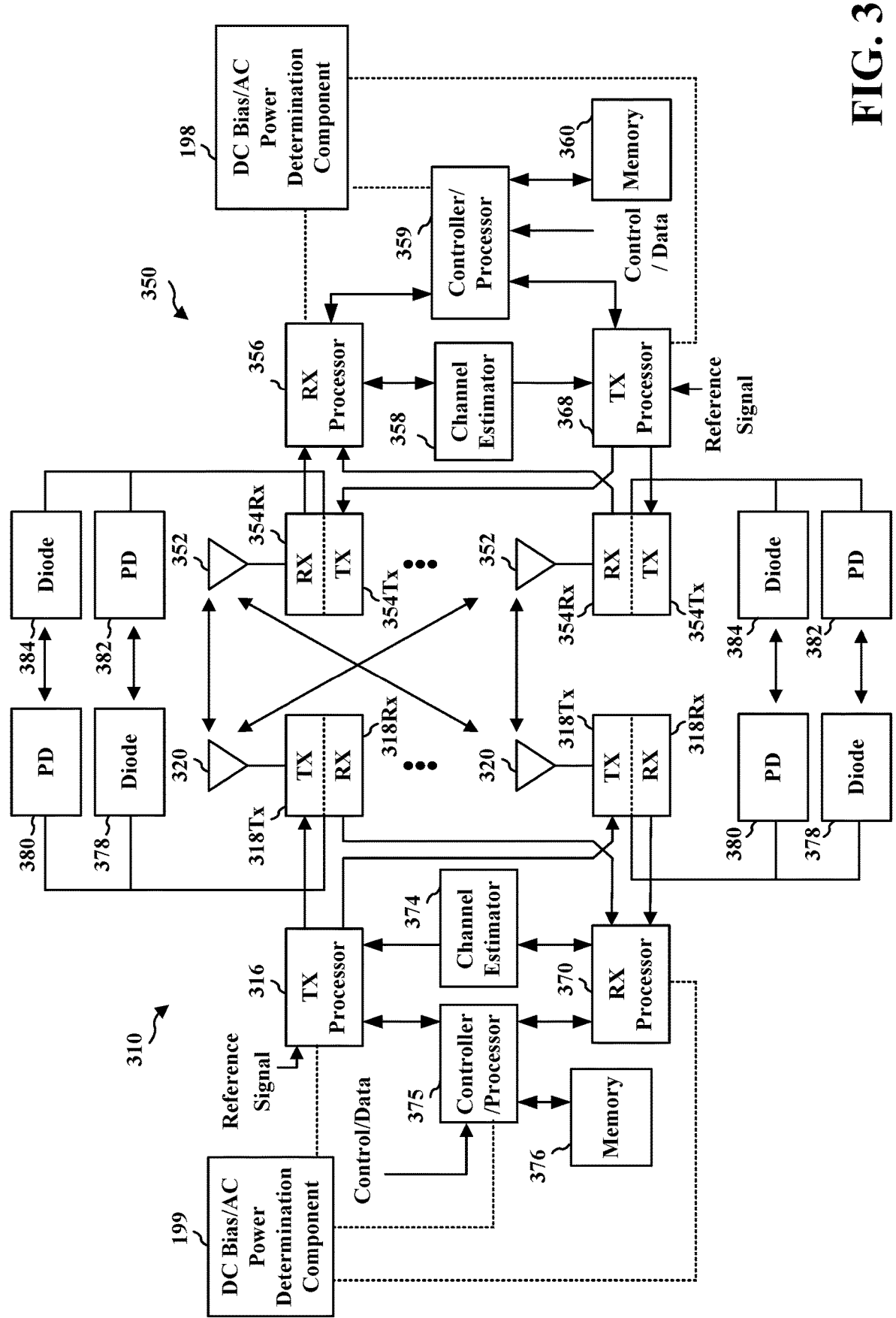
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. In an aspect in which the spatial stream is transmitted optically, each spatial stream may be provided to a respective diode 378. The diode 378 may be configured to convert the spatial stream into an optical (or light) signal including photon energy and transmit the optical signal. Each transmitter 318Tx may modulate a radio frequency (RF) carrier with a respective spatial stream for transmission.

At the UE 350, each receiver 354Rx receives a signal through its respective antenna 352. In an aspect in which an optical signal is received, each receiver 354Rx may receive a signal through a respective photodetector 382. Each photodetector 382 may be configured to receive the photon energy of the signals transmitted by a respective diode 378 and convert the photon energy into an electric signal for subsequent processing by a respective receiver 354Rx. Each receiver 354Rx recovers information modulated onto an RF carrier and/or an optical signal and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 and/or diodes 384 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320 and/or its respective photodetector 380. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DC bias/AC power determination component 198 of FIG. 1.

At least one of the TX processor 316, the RX processor 370, and the controller/processor 375 may be configured to perform aspects in connection with the DC bias/AC power determination component 199 of FIG. 1.

Some wireless communication may utilize higher data rates than other wireless communication. For example, some wireless communication may use data rates such as 1 Terabit per second (1Tbps) per link. In order to achieve such a data rate, a different spectrum may be used than a lower RF spectrum (e.g., a sub-100 GHZ spectrum). In this regard, optical wireless communications (OWC) may be utilized to achieve higher data rates. Optical wireless communication refers to communication that is performed over optical frequencies (e.g., 1013 to 1016 Hz, which may encompass the terahertz (THz) band (e.g. higher ranges thereof), the infrared band, and/or the ultraviolet band). The large bandwidth provided by such optical frequencies enables the communication at the higher data rates.

FIG. 4A illustrates a diagram of an OWC link in accordance with various aspects of the present disclosure. As shown in FIG. 4A, an OWC link may include an OWC transmitter 402 and an OWC receiver 404. Examples of the OWC transmitter 402 and the OWC receiver 404 include, but are not limited to, a network node, a UE, etc. The OWC transmitter 402 may include a diode 406 configured to transmit OWC signals 408, and the OWC receiver 404 may include a photodetector 410 configured to detect and receive the OWC signals 408. It is noted that the OWC transmitter 402 may also be configured to receive OWC signals and the OWC receiver 404 may also be configured to transmit OWC signals. Accordingly, the OWC transmitter 402 may include a photodetector for detecting and receiving OWC signals, and the OWC receiver 404 may include a diode for transmitting OWC signals.

The diode 406 may be configured to receive an electrical current and convert the electrical current into a light signal (e.g., OWC signals 408) including photon energy. Examples of the diode 406 include, but are not limited to a laser diode, a light emitting diode (LED), etc. The OWC signals 408 transmitted by the diode 406 may be transmitted through a lens, which is configured to focus the OWC signals 408 towards the OWC receiver 404. The photodetector 410 may include a diode (e.g., an avalanche photodiode) configured to receive the photon energy of the OWC signals 408 and convert the photon energy into an electric signal for subsequent processing by the OWC receiver 404.

FIG. 4B illustrates additional aspects that may be included in a transmitter and/or a receiver, such as the transmitter 402 or the receiver 404 in FIG. 4A. In some aspects, the transmitter 402 may include an RF waveform generator 412 that generates an RF waveform (as one example, an OFDM waveform), a DC supply 414 that provides power amplification, and a bias tee 416 that provides a DC-biased (e.g., non-negative) waveform to the diode 406. A filter 418 may be provided between the diode 406 and the photodetector 410. In some aspects, the filter 418 may be a component of the receiver 404. The filter 418 may comprise a neutral density filter that emulates an optical path loss. The receiver 404 may include an RF signal analyzer 420 that determines the RF signal from the optical wireless signal from the transmitter 402.

Figures 5A, 5B:
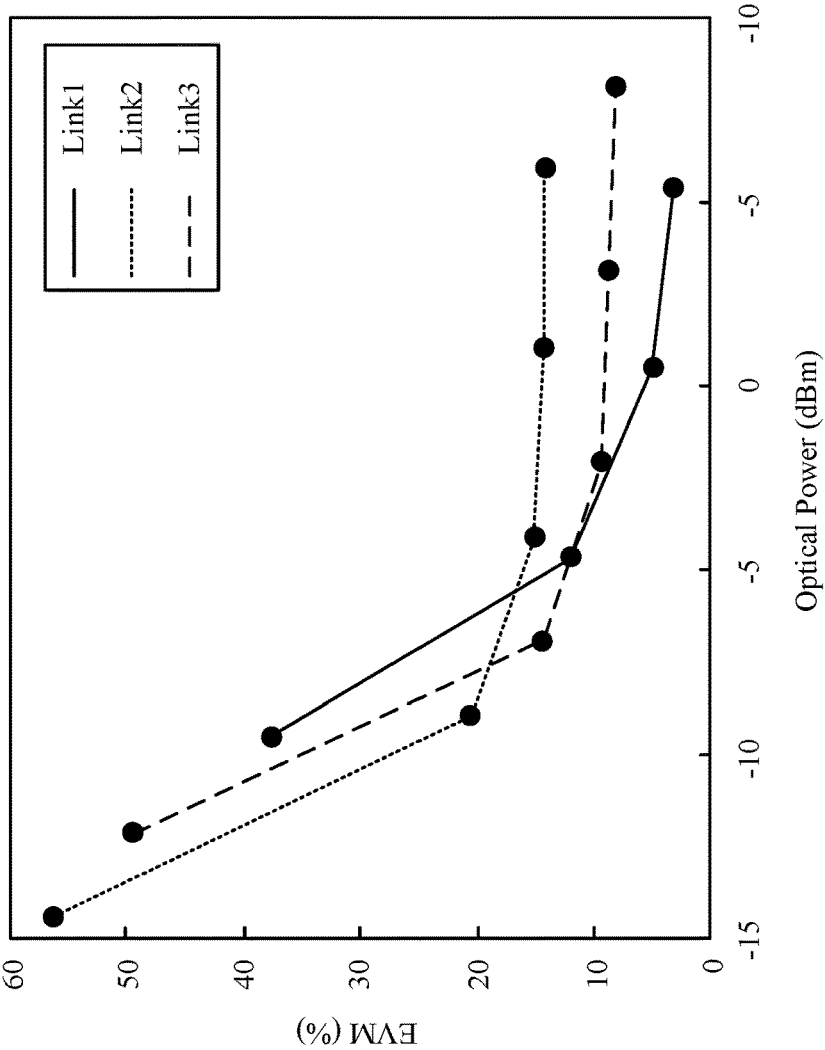
FIG. 5A illustrates a graph correlating the error vector magnitude (EVM) of an OWC signal to the optical power of the OWC signal for three different OWC links.
FIG. 5B illustrates a table depicting different characteristics for the three different link configurations shown in FIG. 5A.
Figure 5C:
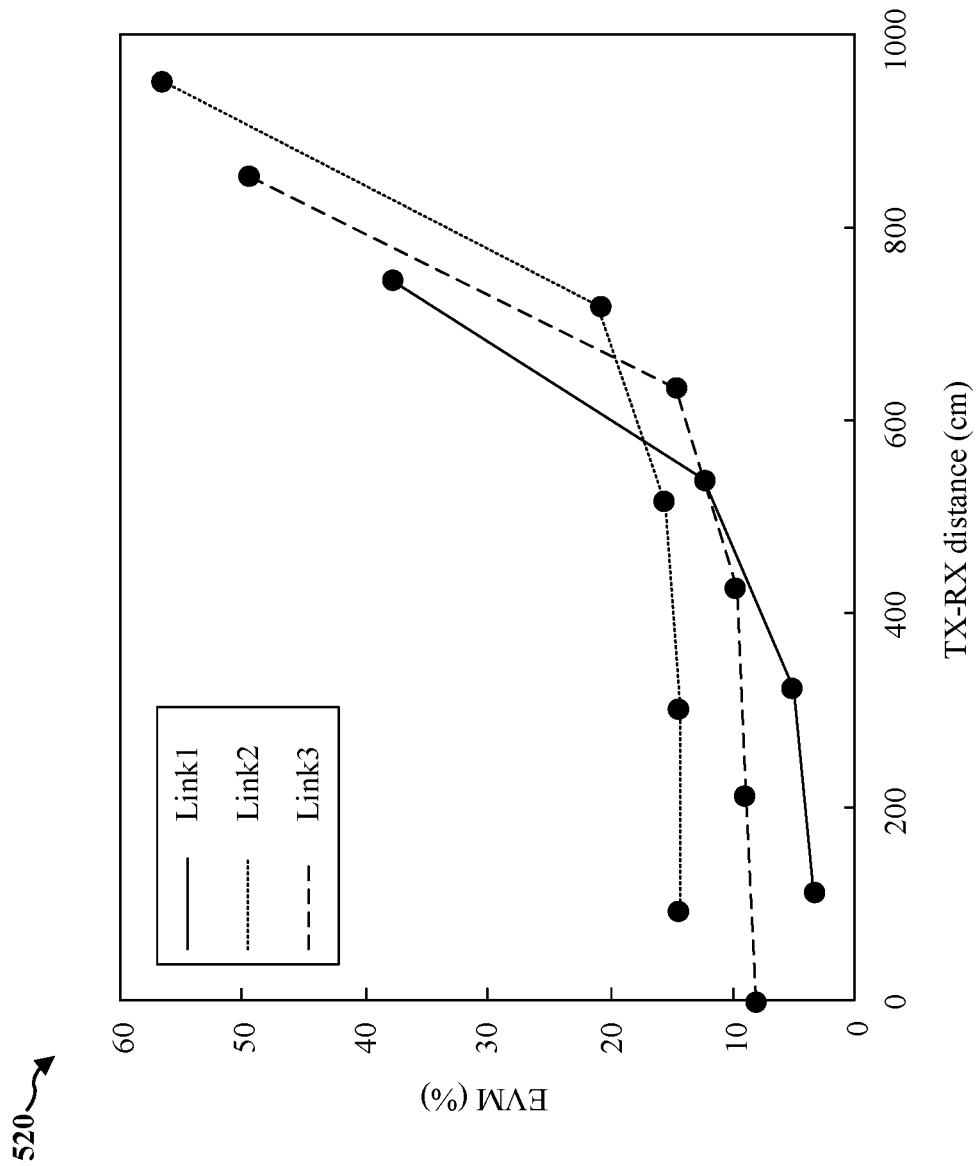
FIG. 5C illustrates a graph correlating the EVM of an OWC signal to different distances between a transmitter and a receiver.

It has been observed that the degradation of an OWC signal increases as the distance between the OWC transmitter 402 and the OWC receiver 404 increases (i.e., as the optical power of the OWC signal decreases). FIG. 5A illustrates a graph 500 correlating the error vector magnitude (EVM) of an OWC signal to the optical power of the OWC signal for three different OWC links. The EVM may represent a level of degradation of the OWC signal. FIG. 5B illustrates a table 510 depicting different characteristics for the three different link configurations shown in FIG. 5A. FIG. 5C illustrates a graph 520 correlating the EVM of an OWC signal to different distances between the OWC transmitter 402 and the OWC receiver 404.

As shown in FIG. 5B, the first link (Link1) configuration may have a bandwidth of 20 MHz, an AC transmit power of −10 decibel-milliwatts (dBm), and a DC bias current of 60 milliamps (mA). As shown in FIGS. 5A and 5C, Link1 performs worse at larger distances (i.e., at smaller optical powers). However, when the optical power is increased (i.e., the OWC transmitter 402 is closer to the OWC receiver 404), the EVM decreases.

With reference to the second link (Link2) configuration, as shown in FIG. 5B, the DC power is fixed at 60 mA, but the AC power is increased to 0 dBM. As shown in FIGS. 5A and 5C, this improves the EVM for smaller values of the optical power (or larger distances) (e.g., at ~8 dBm/~750 cm) when compared to the first link (Link1) configuration. However, for smaller distances (i.e., larger optical powers), the EVM increases.

With reference to the third link (Link3) configuration, as shown in FIG. 5B, the AC power is fixed at 0 dBM, but the AC power is increased by to 90 mA. As shown in FIGS. 5A and 5C, for smaller values of the optical power (or larger distances) (e.g., ~−7 dBm/~650 cm), the link performance is improved when compared to the Link1 and Link2.

Thus, it can be seen that a larger AC power (e.g., signal dynamic range) and/or a larger DC bias helps in closing a longer link at the cost of distortion, which negatively affects the EVM over a shorter link, and therefore, link performance. In addition, the AC power, which governs the dynamic range of the optical intensity of the OWC signal, affects the link performance. As such, for a fixed DC bias, an optical dynamic range (AC power) exists and may be utilized for optical link performance.

Distortions originating at the OWC transmitter 402 may be suppressed with a larger DC bias current. A larger DC bias current may lead to a larger modulation bandwidth. There may be non-linearity when modulation bandwidth is small (e.g., when the bandwidth of the modulated signal becomes greater than the modulation bandwidth of the OWC transmitter 402). A larger DC bias current reduces (e.g., eliminates) clipping that may happen under a relatively large modulation index (defined as the ratio between the root mean square (RMS) AC current and the DC current). However, the DC bias current may be limited by implementation, for example, where eye safety is of concern when utilizing lasers for transmission. In addition, a larger DC bias may correspond to higher power consumption at the OWC transmitter 402, which may not be suitable from an energy efficiency standpoint.

In addition to transmitter-originated distortions, the photodetector 410 may introduce receiver-originated distortions. This is shown in FIGS. 5A and 5C, where the EVM increases due to larger received optical power values using the same AC power and bandwidth parameters. Additionally, the shot noise (also known as quantum noise) of the photodetector 410 (which is proportional to the intensity of the received light) may increase as the received DC bias increases. The shot noise is due to the particular nature of light. For instance, a laser beam may emit photons in accordance with a Poisson distribution. The photodetector 410 may receive a fluctuating number of photons for a given time period. As such, the intensity (or number of photons for a given time period) may fluctuate. These fluctuations are referred to as shot noise. As well, other noise may be introduced at the receiver, such as thermal noise from a feedback resistor and/or noise from one or more amplifiers.

The DC bias (embedded by the OWC transmitter 402 to drive a laser or LED) may perform an implicit automatic gain control (AGC) on the photodetector 410 towards the AC waveform.

When utilizing OWC based on intensity modulation (MD)/direct detection (DD) and DC-biased optical (DCO) OFDM (DCO-OFDM) waveforms, the DC bias may be used to generate non-negative signals, which later may be fed to an LED and/or a laser diode for transmission over an OWC medium (e.g. fiber). A proper DC bias may be considered for OWC. For instance, with a relatively larger DC bias, the generated optical OFDM signal stays non-negative. However, power efficiency is reduced as DC bias is not used for demodulation at the OWC receiver 404. Utilizing a larger DC bias also allows for a larger modulation bandwidth and smaller modulation depth for both LED and laser diode-based transmissions, which results in better linearity so long as the LED or laser diode is not driven into the saturation region. However, utilizing a larger DC bias may increase eye safety concerns in OWC and may result in stronger shot noise and relative intensity noise.

On the other hand, a relatively small DC bias may cause an optical OFDM signal to become negative, and thus, clipped by the LED or laser diode, which causes distortion. In addition, a relatively small DC bias may reduce coverage. Moreover, for laser diode-based transmissions, a smaller DC bias may allow for a smaller modulation bandwidth and larger modulation depth, resulting in non-linearity.

Aspects of the present disclosure provide for a mechanism for selecting a DC bias and/or AC power for optimal or improved OWC link performance. In particular, a signaling feedback technique may be utilized between an OWC transmitter and an OWC receiver to select a proper DC bias and/or AC power for optimizing the OWC link performance. For instance, an OWC transmitter may initially select a DC bias (e.g., a default DC bias) and/or an AC power (e.g., a default AC power) to optimize its own transmission performance. The selected DC bias and/or default AC power may result in a non-negative optical OFDM waveform with minimized clipping distortion, may result in a modulation bandwidth that is greater than the transmitted signal bandwidth, and may result in a light intensity that does not exceed light intensities that are hazardous for safety (e.g., when utilizing a laser diode-based transmitter). The OWC receiver, upon receiving the light intensity signal (i.e., an OWC signal) with the transmitted DC bias and/or AC power selected by the OWC transmitter, may perform measurements based on the DC bias and/or AC power (e.g., the OWC receiver may evaluate the DC bias and/or AC power utilized to transmit the OWC signal), measure shot noise, etc. As described, the DC bias acts as an internal automatic gain control for the photodetector 410. As a result, the received DC bias may drive the photodetector 410 in its linear region to avoid non-linear distortion. After performing the measurements, the OWC receiver may make a recommendation on a refined DC bias range and/or AC power range to the OWC transmitter. The OWC transmitter may select a DC bias and an AC power based on the recommendations of the OWC receiver.

Figure 6:
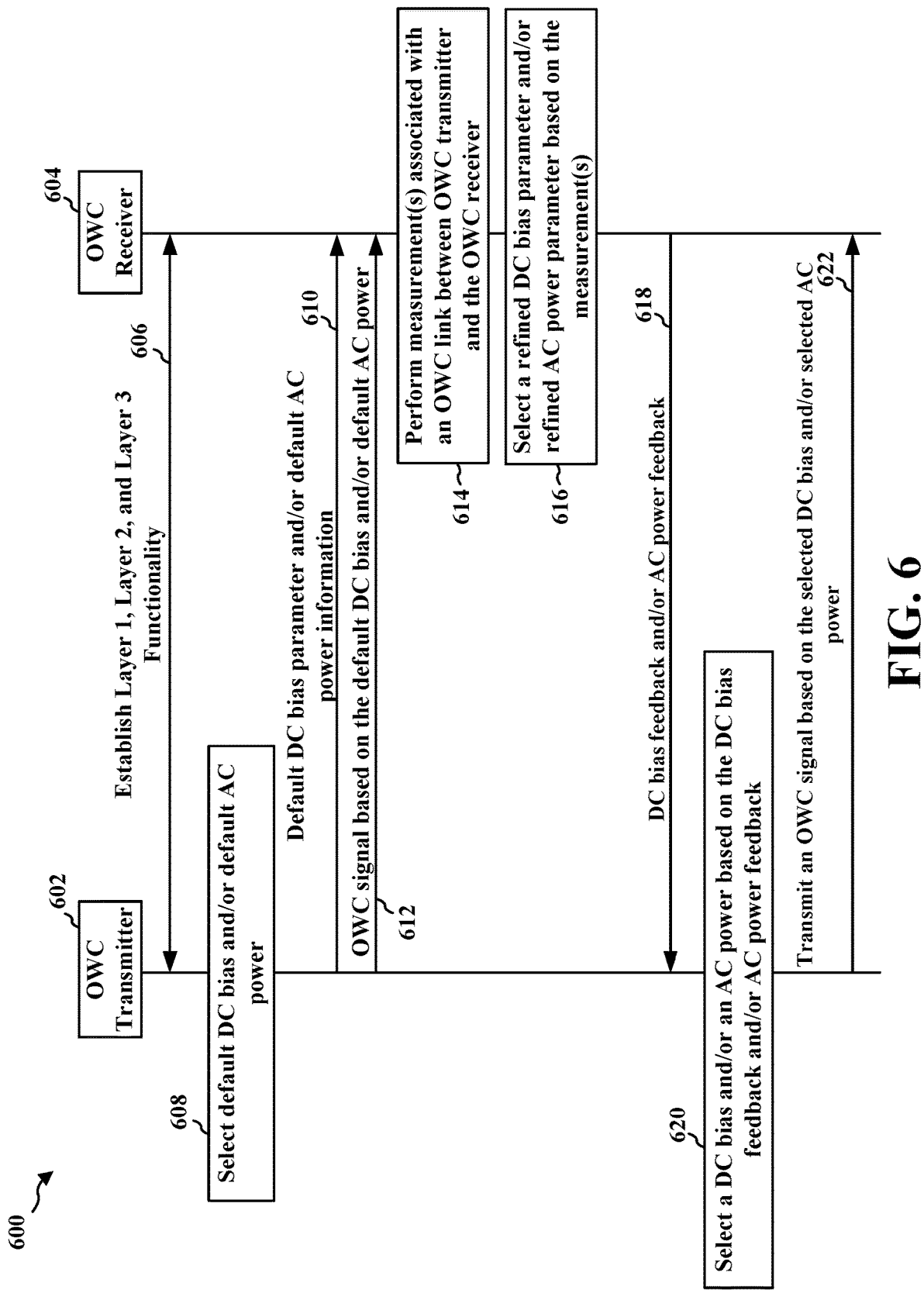
FIG. 6 is a call flow diagram illustrating a method of wireless communication in accordance with various aspects of this present disclosure.

FIG. 6 is a call flow diagram 600 illustrating a method of wireless communication in accordance with various aspects of this present disclosure. As shown in FIG. 6, an OWC transmitter 602 and an OWC receiver 604 may, at 606, establish layer 1, layer 2, and layer 3 connections. Such functionality or connections may be established via a link other than an OWC link (e.g., via RF signals transmitted via a cellular link, Wi-Fi, etc.). In some aspects, the OWC transmitter 602 may be a network node, and the OWC receiver 604 may be a UE. In other aspects, the OWC transmitter 602 may be a UE, and the OWC receiver 604 may be a network node. In further aspects, the OWC transmitter 602 may be a first UE, and the OWC receiver 604 may be a second UE. Although aspects are described for a network node, the aspects may be performed by a network node in aggregation and/or by one or more components of a network node (e.g., such as a CU 110, a DU 130, and/or an RU 140).

At 608, the OWC transmitter 602 may select a default DC bias value and/or a default AC power value. The selected default DC bias value and/or default AC power value may be dependent on the operating characteristics or conditions (e.g., the supported current, voltage, and/or optical power) of the OWC transmitter 602. For instance, the OWC transmitter 602 may select a default DC bias value from a range of supported DC bias values and select a default AC power value from a range of supported AC power values.

Figures 7A, 7B:
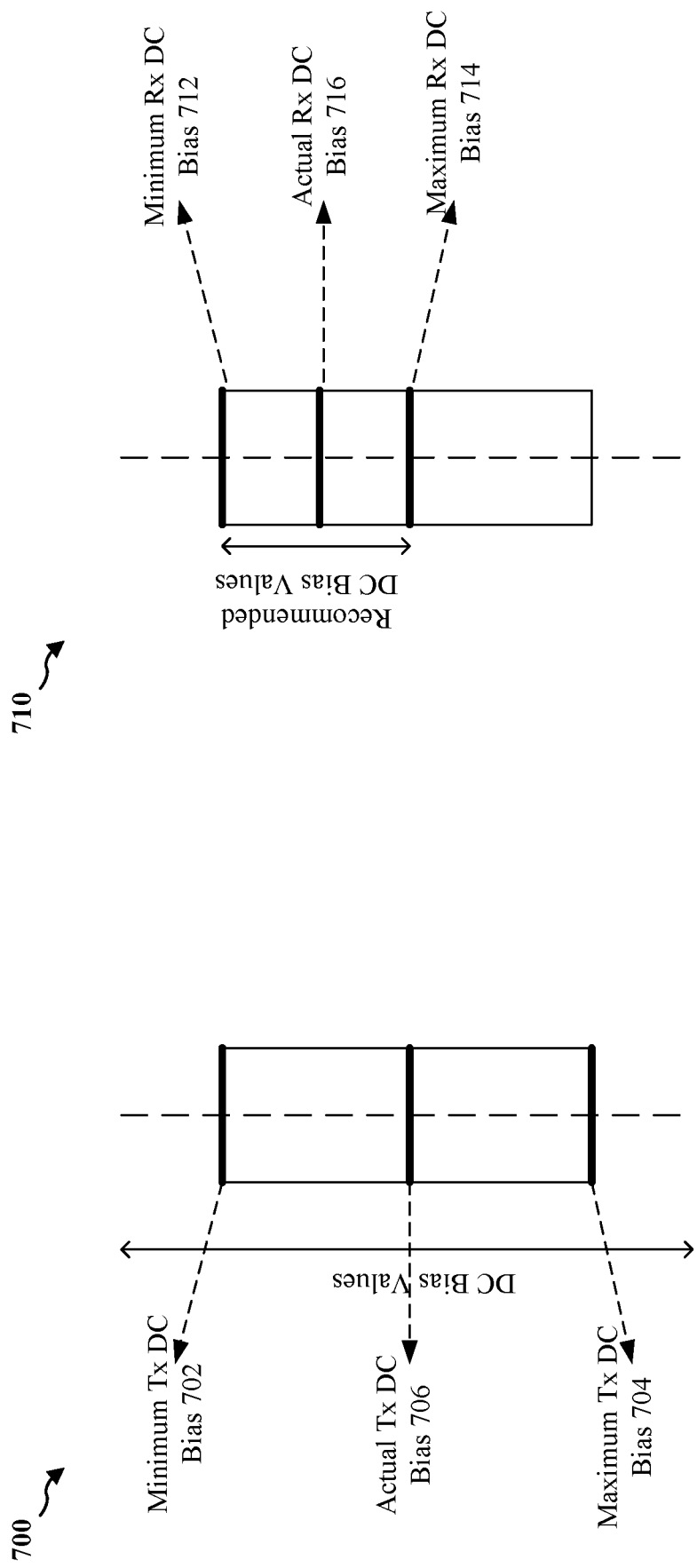
FIG. 7A is a diagram illustrating a range of DC bias values supported by an OWC transmitter in accordance with various aspects of the present disclosure.
FIG. 7B is a diagram illustrating a refined range of DC bias values determined by an OWC receiver in accordance with various aspects of the present disclosure.

FIG. 7A is a diagram 700 illustrating a range of DC bias values supported by the OWC transmitter 602 in accordance with various aspects of the present disclosure. As shown in FIG. 7A, the range may include a minimum DC bias value 702 and a maximum DC bias value 704. The default DC bias value may be selected from within the range defined by the minimum DC bias value 702 and the maximum DC bias value 704. For example, as shown in FIG. 7A, the default DC bias value selected by the OWC transmitter 602 is shown as a DC bias value 706. The DC bias value 706 may be selected from the range defined by the minimum DC bias value 702 and the maximum DC bias value 704 to optimize the link performance of the OWC transmitter 602. For instance, the DC bias value 706 may be selected from the range based on the type of diode utilized by the OWC transmitter 602 to transmit an OWC signal (e.g., based on whether the diode is a laser diode, an LED, etc.), the link distance (i.e., the distance between the OWC transmitter 602 and the OWC receiver 604), etc.

Similarly, the AC power value may be selected from a range (e.g., dynamic range) defined by a minimum AC power value and a maximum AC power value to optimize the EVM (and therefore, the link performance) of the OWC transmitter 602. For instance, the AC power value may be selected from the range based on the type of diode utilized by the OWC transmitter 602 to transmit an OWC signal (e.g., based on whether the diode is a laser diode, an LED, etc.), the link distance (i.e., the distance between the OWC transmitter 602 and the OWC receiver 604), etc.

At 610, the OWC transmitter 602 may transmit a default DC bias parameter including the DC bias value 706 and/or the DC bias value range (e.g., defined by the minimum DC bias value 702 and the maximum DC bias value 704) and/or an AC power information including the default AC power value and/or the AC power range to the OWC receiver 604. The transmitter may jointly signal or indicate the default AC power value and/or the AC power range with the default DC bias and/or DC bias value range for further optimization of the OWC link performance. In some aspects, the OWC transmitter 602 indicates the DC bias parameter and/or the AC power information to the OWC receiver 604 via level 3 signaling (e.g., RRC signaling).

At 612, the OWC transmitter 602 may transmit an OWC signal based on the default DC bias and/or default AC power. That is, the OWC transmitter 602 may set the DC bias parameter and/or the AC power parameter of its diode (e.g., the diode 406) to the default DC bias and/or default AC power, respectively, and transmit the OWC signal.

At 614, the OWC receiver 604 may perform measurement(s) associated with the OWC link between the OWC transmitter and the OWC receiver. For example, the OWC receiver 604 may perform measurements for the OWC signal received at 612. For example, the OWC receiver 604 may determine the voltage of the OWC signal that is generated based on the default DC bias value and/or default AC power value and determine whether the received OWC signal has enough dynamic range to enable the OWC receiver 604 to properly decode the signal.

At 616, based on the measurements, the OWC receiver 604 may refine the DC bias range and/or the AC power range and select a DC bias value within the refined DC bias range and/or an AC power value within the refined AC power range that may optimize the performance of the OWC receiver 604. For instance, the OWC receiver 604 may select the DC bias value and/or the AC power value based on the operating characteristics or conditions (e.g., the supported current, voltage, and/or optical power) of its photodetector (e.g., photodetector 410), shot noise associated with the photodetector, and/or any other criteria that may affect the link performance. By doing so, this enables the OWC receiver 604 to select the operating point of its photodetector (e.g., photodetector 410) for maximized linearity, and therefore, optimal link performance.

FIG. 7B is a diagram 710 illustrating a refined range of DC bias values determined by the OWC receiver 604 in accordance with various aspects of the present disclosure. As shown in FIG. 7B, the refined range may include a refined minimum DC bias value 712 and a refined maximum DC bias value 714. As shown in FIG. 7B, the refined range of DC bias values may be a subset of (e.g., narrower than) the range of DC bias values shown in FIG. 7A. The new DC bias value may be selected by the OWC receiver 604 from within the range defined by the refined minimum DC bias value 712 and the refined maximum DC bias value 714. For example, as shown in FIG. 7B, the new DC bias value selected by the OWC receiver 604 is shown as a DC bias value 716. The DC bias value 716 may be selected from the range defined by the refined minimum DC bias value 712 and the refined maximum DC bias value 714 to optimize the link performance of the OWC receiver 604.

Similarly, the AC power value may be selected from a range (e.g., dynamic range) defined by a refined minimum AC power value and a refined maximum AC power value to optimize the EVM (and therefore, the link performance) of the OWC receiver 604. For instance, the AC power value may be selected from the range based on the type of diode utilized by the OWC transmitter 602 to transmit an OWC signal (e.g., based on whether the diode is a laser diode, an LED, etc.), the link distance (i.e., the distance between the OWC transmitter 602 and the OWC receiver 604), etc.

At 618, the OWC receiver 604 may provide DC bias feedback and/or AC power feedback to the OWC transmitter 602. The DC bias feedback and/or AC power feedback may include an acknowledgment of the reception of the default DC bias parameter and/or default AC power information at 610. The DC bias feedback may further include the new DC bias value and/or the refined range of DC bias values (as a recommendation for the OWC transmitter 602 to utilize), and the AC power feedback may include the new AC power value and/or the refined range of AC power values (as a recommendation for the OWC transmitter 602 to utilize). The range of DC biases may correspond to a range over which the performance of the OWC receiver 604 is not compromised (e.g., the photodetector or a silicon photomultiplier (SiPM) of the OWC receiver 604 is not driven into saturation, the shot noise level is not relatively high, etc.). In some aspects, the OWC receiver 604 indicates the DC bias parameter and/or the AC power information to the OWC receiver 604 via level 1 or level 2 signaling.

At 620, the OWC transmitter 602 may select a DC bias value and/or an AC power value based on the DC bias feedback and/or AC power feedback received at 618. For instance, the OWC transmitter 602 may select a DC bias value from within the refined range of DC bias values received via the DC bias feedback and/or may select an AC power value from within the refined range of AC power values received via the AC power feedback. Because the DC bias value and/or selected AC power value are selected from the refined range provided by the OWC receiver 604, the selected DC bias value and/or selected AC power value optimize the link performance for both the OWC transmitter 602 and the OWC receiver 604.

At 622, the OWC transmitter 602 may transmit an OWC signal to the OWC receiver 604 based on the selected DC bias value and/or the selected AC power value. For instance, the OWC transmitter 602 may set the DC bias and/or AC power associated with its diode (e.g., the diode 406) to the DC bias value and/or AC power value, respectively, and transmit the OWC signal from the diode.

Aspects presented herein may be used in OWC communication in various settings. As an example, the aspects may be employed to provide more reliable wireless connectivity for industrial wireless networks where devices may experience unstable RF connections due to electromagnetic compatibility (EMC) challenges. Aspects may be employed between medical electrical (ME) equipment to allow for adjusted separation distances between devices while avoiding performance degradation. Aspects may be employed in areas with dense users, such as in an enterprise environment. In an industrial environment, for example, devices may be sensitive to electromagnetic interference. Link distances may be greater than 10 m, and coverage may be provided with low mobility. Such OWC communication may be provided, e.g., with an LED-based wide beam link. As an example, a Lambertian transmit beam may use a 40 dBm optical power. A wide field of view (FOV) receiver may have resistance to ambient light interference with the OWC. As one, non-limiting example, the receiver may have an operating bandwidth of greater than 100 MHZ. Narrow beam links may provide peak data rates and high spectral efficiency. As an example, a Gaussian transmit beam (with a regulation allowed maximum optical power) may communicate with a narrow FOV receiver. The communication may be within a 1G Hz (per lambda) operating bandwidth and using a different waveform.

In some aspects, the transmitter (e.g., transmitter 402) may perform electro-optical conversion to provide an optical intensity signal (e.g., the OWC signals 408) based on an electrical signal, and the receiver (e.g., receiver 404) may perform opto-electrical conversion to obtain the electrical signal from the received optical intensity signal. An example technique for OWC may include intensity modulation and direct detection (IM-DD). The transmission of the optical intensity signal from the transmitter may be from a light emitting diode (LED) or a laser diode (LD), among other examples. The reception may be based on photo detectors (PDs). The information to be transmitted modulates the intensity of light emitted from the LEDs or LDs, and the photodetector detects the received light intensity and outputs signals. The transmitted optical intensity signal may be a non-negative signal, which may be provided through the use of peak and average constraints. In order to provide a real, non-negative optical signal for OWC, the transmitted signal is real-valued. The DC bias may be used to provide the non-negative signal. Clipping, e.g., clipping the signal at zero, may be used to provide the non-negative signal. Clipping introduces noise to the signal, and a larger DC bias lowers the clipping noise. The DC bias may have different effects on the signal based on different types of diodes (e.g., LED compared to LD) used at the transmitter. OWC may allow for large bandwidths in comparison to RF based communication. OWC may enable communication on unlicensed spectrums, such as infrared and visible light spectrums. The use of LEDs or LDs and photodetectors may enable OWC communication with cost efficient components. LD-based transmissions may be highly directional having higher optical power outputs and broader modulation bandwidths and may be used for outdoor settings. LEDs may provide large area emitters with less directionality than LDs. LEDs may provide added cost efficiencies, may be used in indoor settings, and may provide lower data rates. OWC may be less affected by electromagnetic interference and may provide higher security due to penetration loss. The capacity, capacity achieving schemes, and other performance aspects of OWC may be different than those for RF based communication.

An LED used for OWC may be modelled as a Lambertian emitter. That is, when the total radiant flux is Pro, the transmitted light density at a given angle φ is $$\frac{(m+1)\cos^m(\varphi)}{2\pi}P_{T,O} \quad \text{(Eq. 1)}$$

where $m = -1/\log_2(\cos(\varphi_{1/2}))$ and $\varphi_{1/2}$ is the angle at which the source intensity is half compared to the intensity when the source is viewed straight on axis.

The photodetector (e.g., photodetector 410) may operate as a directional receive antenna. As an example, PD collects light that hits its effective collection area in accordance with Equation 2, which is provided below:

$$\cos(\psi)A_d\frac{n^2}{\sin^2(FOV)} \quad \text{(Eq. 2)}$$

where $A_d$ is the physical size of PD and n is refractive index≈1.5. The FOV may correspond to the maximum angle at which light incident can be successfully guided to the detector. The photodetector may receive the signal via one or more optics that guide the light to the detector. The receiving antenna gain may correspond to $$\frac{1}{\sin^2(FOV)} \quad \text{(Eq. 3)}$$

For an RF link, denoting $P_R$ as the received power before LNA, the power collection ratio may be calculated as a function of distance d, transmit antenna gain $G_T$, receiving antenna gain $G_R$, and the central carrier frequency f, corresponding to:

$$\eta_{RF} = \frac{P_R}{P_T} \approx G_T G_R \left(\frac{c}{4\pi d f}\right)^2 \quad \text{(Eq. 4)}$$

For an OWC link, denoting $P_{T,O}$ as the optical power emitted by a LED and $P_{R,O}$ that collected by a PD, the power collection ratio may be a function of distance d, of 3 dB Lambertian beamwidth $\varphi_{1/2}$, PD physical area size Aa, and PD FOV, corresponding to:

$$\eta_{OWC} = \frac{P_{R,O}}{P_{T,O}} \approx \frac{(-1/\log 2(\cos{(\varphi_{1/2})}))^{+1})A_d 1.5^2}{2\pi d^2 \sin^2(FOV)} \quad \text{(Eq. 5)}$$

Figure 8:
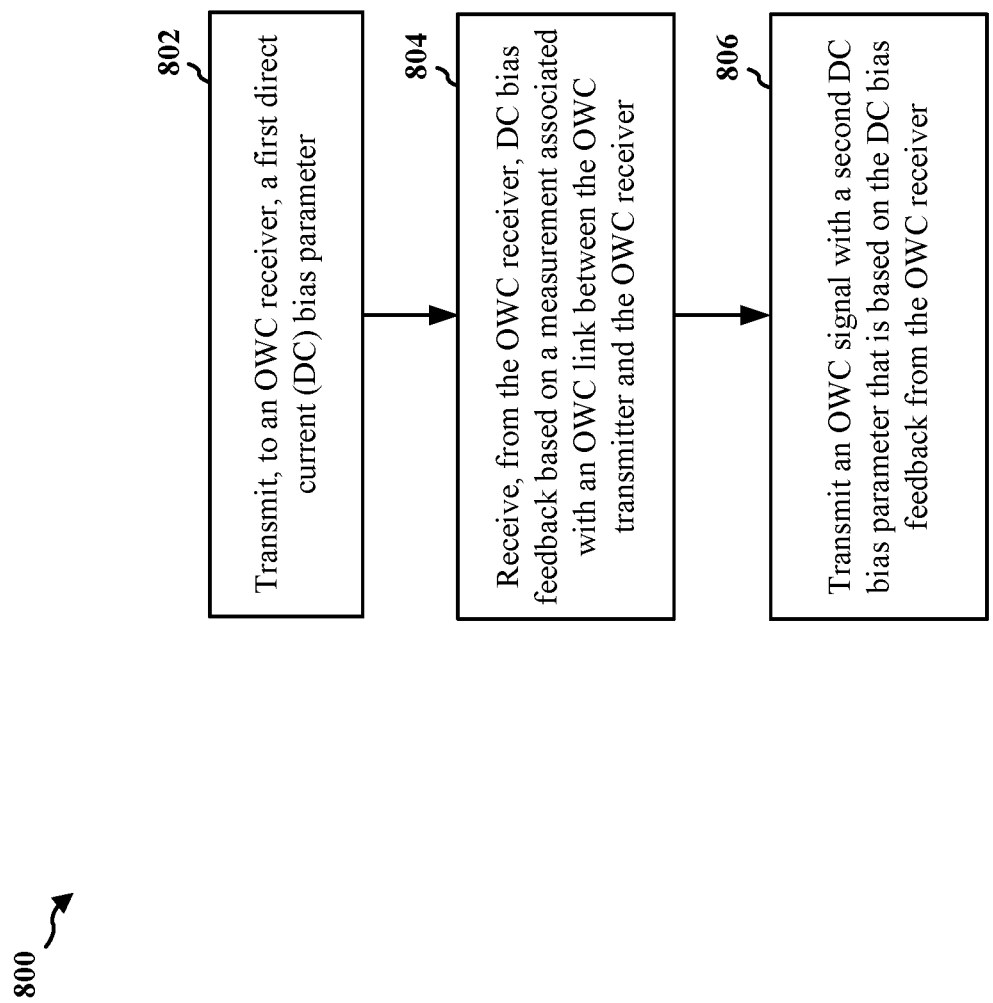
FIG. 8 is a flowchart illustrating methods of wireless communication at an OWC transmitter in accordance with various aspects of the present disclosure.

FIG. 8 is a flowchart 800 illustrating methods of wireless communication at an OWC transmitter in accordance with various aspects of the present disclosure. In some aspects, the OWC transmitter may be the OWC transmitter 402 of FIG. 4 or the OWC transmitter 602 of FIG. 6. In some aspects, the OWC transmitter may be a network node. The network node may be a base station, or a component of a base station, in the access network of FIG. 1 or a core network component (e.g., base station 102, 310; the CU 110, the DU 130; the RU 140; or the network entity 1302 in the hardware implementation of FIG. 13). In other aspects, the OWC transmitter may be a UE. The UE may be the UE 104, 350, or the apparatus 1204 in the hardware implementation of FIG. 12.

At 802, the OWC transmitter may transmit, to an OWC receiver, a first DC bias parameter. For example, referring to FIG. 6, the OWC transmitter 602 may, at 610, transmit a first DC bias parameter to the OWC receiver 604. In an aspect in which the OWC transmitter is a UE, 802 may be performed by the DC bias/AC power determination component 198. In an aspect in which the OWC transmitter is a network node, 802 may be performed by the DC bias/AC power determination component 199.

In some aspects, the first DC bias parameter may include at least one of a DC bias value or a range of DC bias values. For example, referring to FIG. 6, the first DC bias parameter transmitted at 610 may include at least one of a DC bias value (e.g., DC bias value 706, as shown in FIG. 7A) or a range of DC bias values (e.g., a range defined by minimum DC bias value 702 and maximum DC bias value 704, as shown in FIG. 7A).

In some aspects, the OWC transmitter may indicate the first DC bias parameter to the OWC receiver via level 3 signaling. For example, referring to FIG. 6, the OWC transmitter 602 may, at 610, indicate the first DC bias parameter to the OWC receiver 604 via level 3 signaling.

In some aspects, the OWC transmitter may transmit AC power information including a first AC power parameter to the OWC receiver. For example, referring to FIG. 6, the OWC transmitter 602 may, at 610, transmit AC power information including a first AC power parameter to the OWC receiver 604. In some aspects, the AC power information and the first DC bias parameter may be transmitted via the same message. In other aspects, the AC power information and the first DC bias parameter may be transmitted via different messages.

In some aspects, the AC power information may be included in level 3 signaling. For example, referring to FIG. 6, the OWC transmitter 602 may, at 610, indicate the AC power information to the OWC receiver 604 via level 3 signaling.

At 804, the OWC transmitter may receive, from the OWC receiver, DC bias feedback based on a measurement associated with an OWC link between the OWC transmitter and the OWC receiver. For example, referring to FIG. 6, the OWC transmitter 602 may, at 618, receive, from the OWC receiver 604, DC bias feedback based on a measurement associated with the OWC signal received at 612. In an aspect in which the OWC transmitter is a UE, 804 may be performed by the DC bias/AC power determination component 198. In an aspect in which the OWC transmitter is a network node, 804 may be performed by the DC bias/AC power determination component 199.

In some aspects, the DC bias feedback from the OWC receiver may be included in one of level 1 signaling or level 2 signaling. For example, referring to FIG. 6, the DC bias feedback received at 618 from the OWC receiver 604 may be included in one of level 1 signaling or level 2 signaling.

In some aspects, the DC bias feedback from the OWC receiver may include an acknowledgement of reception of the first DC bias parameter. For example, referring to FIG. 6, the DC bias feedback received at 618 from the OWC receiver 604 may include an acknowledgement of reception of the first DC bias parameter at 610.

In some aspects, the DC bias feedback from the OWC receiver may include at least one of a DC bias value or a range of DC bias values. For example, referring to FIG. 6, the DC bias feedback received at 618 may include at least one of a DC bias value (e.g., DC bias value 716, as shown in FIG. 7B) or a range of DC bias values (e.g., a range defined by the refined minimum DC bias value 712 and the refined maximum DC bias value 714, as shown in FIG. 7B).

In some aspects, the OWC transmitter may receive, from the OWC receiver, AC power feedback. For example, referring to FIG. 6, the OWC transmitter may, at 618, receive, from the OWC receiver 604, AC power feedback. In some aspects, the AC power feedback and the DC bias feedback may be received via the same message. In other aspects, the AC power feedback and the DC bias feedback may be received via different messages.

In some aspects, the AC power feedback may be included in one of level 2 signaling or level 3 signaling. For example, referring to FIG. 6, the AC power feedback received at 618 from the OWC receiver 604 may be included in one of level 1 signaling or level 2 signaling.

At 806, the OWC transmitter may transmit an OWC signal with a second DC bias parameter that is based on the DC bias feedback from the OWC receiver. For example, referring to FIG. 6, the OWC transmitter 602 may, at 622, transmit an OWC signal with a second DC bias parameter that is based on the DC bias feedback (received at 618). For instance, the OWC transmitter 602 may, at 618, select a DC bias value based on the DC bias feedback received at 618 and transmit the OWC signal using the selected DC bias value. In an aspect in which the OWC transmitter is a UE, 806 may be performed by the DC bias/AC power determination component 198. In an aspect in which the OWC transmitter is a network node, 806 may be performed by the DC bias/AC power determination component 199.

In some aspects, the OWC transmitter may transmit the OWC signal to the OWC receiver with a second AC parameter based on the AC power feedback from the OWC receiver. For example, referring to FIG. 6, the OWC transmitter may, at 622, transmit the OWC signal to the OWC receiver 604 with a second AC parameter based on the AC power feedback from the OWC receiver (received at 618). For instance, the OWC transmitter 602 may, at 620, select an AC power value based on the AC bias feedback received at 618 and transmit the OWC signal using the selected AC power value (e.g., in addition to the selected DC bias value).

In some aspects, the OWC transmitter may be a network node, and the OWC receiver may be a UE. For example, referring to FIG. 6, the OWC transmitter 602 may be a network node (e.g., base station 102, 310; the CU 110, the DU 130; the RU 140; or the network entity 1302 in the hardware implementation of FIG. 13), and the OWC receiver 604 may be a UE (e.g., the UE 104, 350, or the apparatus 1204 in the hardware implementation of FIG. 12).

In some aspects, the OWC transmitter may be a UE, and the OWC receiver may be a network node. For example, referring to FIG. 6, the OWC transmitter 602 may be a UE (e.g., the UE 104, 350, or the apparatus 1204 in the hardware implementation of FIG. 12), and the OWC receiver 604 may be a network node (e.g., base station 102, 310; the CU 110, the DU 130; the RU 140; or the network entity 1302 in the hardware implementation of FIG. 13).

In some aspects, the OWC transmitter may be a first UE, and the OWC receiver may be a second UE. For example, referring to FIG. 6, the OWC transmitter 602 may be a first UE (e.g., the UE 104, 350, or the apparatus 1204 in the hardware implementation of FIG. 12), and the OWC receiver 604 may be a second UE (e.g., the UE 104, 350, or the apparatus 1204 in the hardware implementation of FIG. 12).

Figure 9:
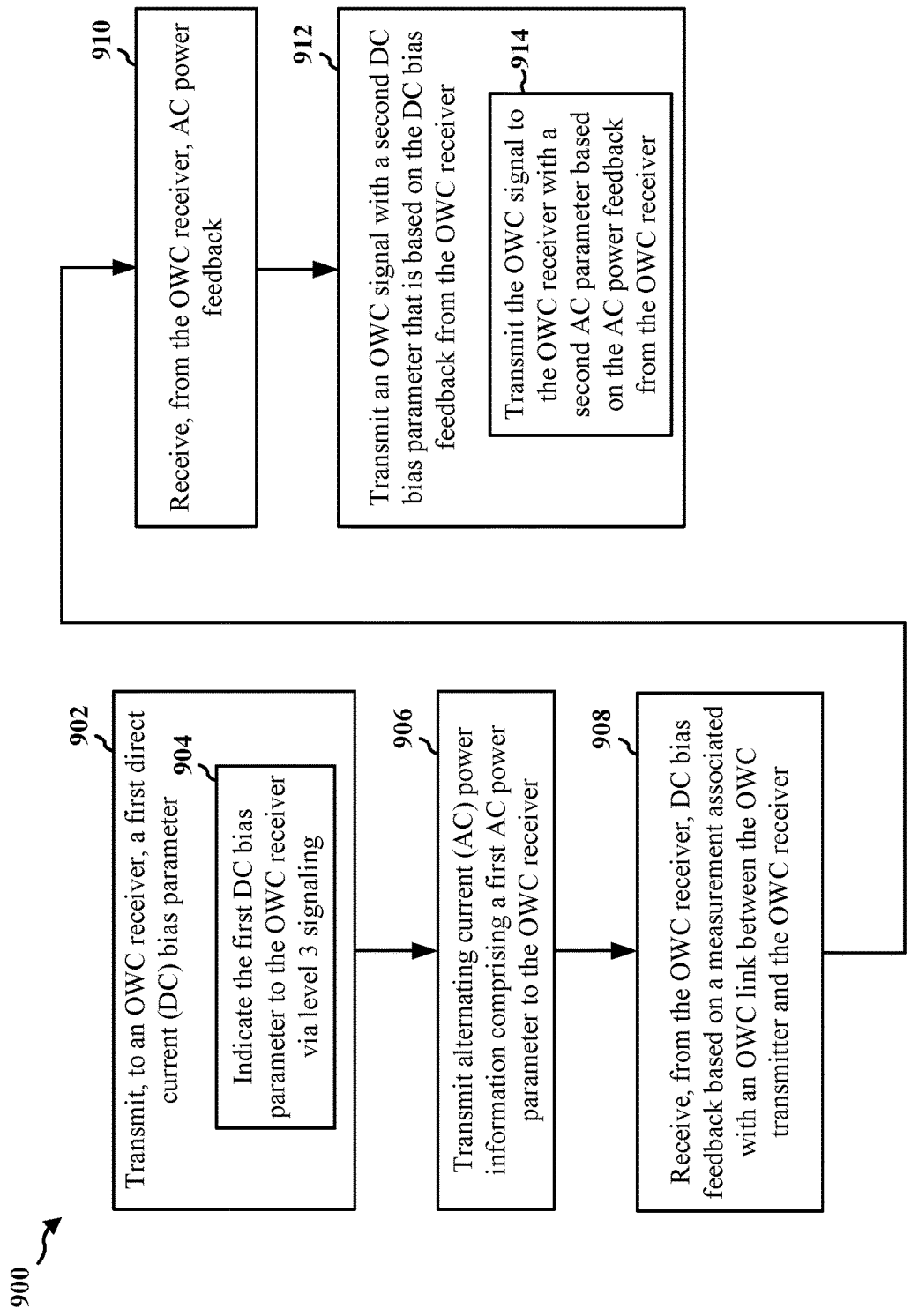
FIG. 9 is a flowchart illustrating methods of wireless communication at an OWC transmitter in accordance with various aspects of the present disclosure.

FIG. 9 is a flowchart 900 illustrating methods of wireless communication at an OWC transmitter in accordance with various aspects of the present disclosure. In some aspects, the OWC transmitter may be the OWC transmitter 402 of FIG. 4 or the OWC transmitter 602 of FIG. 6. In some aspects, the OWC transmitter may be a network node. The network node may be a base station, or a component of a base station, in the access network of FIG. 1 or a core network component (e.g., base station 102, 310; the CU 110, the DU 130; the RU 140; or the network entity 1302 in the hardware implementation of FIG. 13). In other aspects, the OWC transmitter may be a UE. The UE may be the UE 104, 350, or the apparatus 1204 in the hardware implementation of FIG. 12.

At 902, the OWC transmitter may transmit, to an OWC receiver, a first DC bias parameter. For example, referring to FIG. 6, the OWC transmitter 602 may, at 610, transmit a first DC bias parameter to the OWC receiver 604.

In some aspects, as part of 902, at 904, the OWC transmitter may indicate the first DC bias parameter to the OWC receiver via level 3 signaling. For example, referring to FIG. 6, the OWC transmitter 602 may, at 610, indicate the first DC bias parameter to the OWC receiver 604 via level 3 signaling.

In some aspects, the first DC bias parameter may include at least one of a DC bias value or a range of DC bias values. For example, referring to FIG. 6, the first DC bias parameter transmitted at 610 may include at least one of a DC bias value (e.g., DC bias value 706, as shown in FIG. 7A) or a range of DC bias values (e.g., a range defined by minimum DC bias value 702 and maximum DC bias value 704, as shown in FIG. 7A).

At 906, the OWC transmitter may transmit AC power information including a first AC power parameter to the OWC receiver. For example, referring to FIG. 6, the OWC transmitter 602 may, at 610, transmit AC power information including a first AC power parameter to the OWC receiver 604.

In some aspects, the AC power information may be included in level 3 signaling. For example, referring to FIG. 6, the OWC transmitter 602 may, at 610, indicate the AC power information to the OWC receiver 604 via level 3 signaling.

In some aspects, the AC power information and the first DC bias parameter may be transmitted via the same message. In other aspects, the AC power information and the first DC bias parameter may be transmitted via different messages.

At 908, the OWC transmitter may receive, from the OWC receiver, DC bias feedback based on a measurement associated with an OWC link between the OWC transmitter and the OWC receiver. For example, referring to FIG. 6, the OWC transmitter 602 may, at 618, receive, from the OWC receiver 604, DC bias feedback based on a measurement associated with the OWC signal received at 612.

In some aspects, the DC bias feedback from the OWC receiver may be included in one of level 1 signaling or level 2 signaling. For example, referring to FIG. 6, the DC bias feedback received at 618 from the OWC receiver 604 may be included in one of level 1 signaling or level 2 signaling.

In some aspects, the DC bias feedback from the OWC receiver may include an acknowledgement of reception of the first DC bias parameter. For example, referring to FIG. 6, the DC bias feedback received at 618 from the OWC receiver 604 may include an acknowledgement of reception of the first DC bias parameter at 610.

In some aspects, the DC bias feedback from the OWC receiver may include at least one of a DC bias value or a range of DC bias values. For example, referring to FIG. 6, the DC bias feedback received at 618 may include at least one of a DC bias value (e.g., DC bias value 716, as shown in FIG. 7B) or a range of DC bias values (e.g., a range defined by the refined minimum DC bias value 712 and the refined maximum DC bias value 714, as shown in FIG. 7B).

At 910, the OWC transmitter may receive, from the OWC receiver, AC power feedback. For example, referring to FIG. 6, the OWC transmitter may, at 618, receive, from the OWC receiver 604, AC power feedback. In some aspects, the AC power feedback and the DC bias feedback may be received via the same message. In other aspects, the AC power feedback and the DC bias feedback may be received via different messages.

In some aspects, the AC power feedback may be included in one of level 2 signaling or level 3 signaling. For example, referring to FIG. 6, the AC power feedback received at 618 from the OWC receiver 604 may be included in one of level 1 signaling or level 2 signaling.

At 912, the OWC transmitter may transmit an OWC signal with a second DC bias parameter that is based on the DC bias feedback from the OWC receiver. For example, referring to FIG. 6, the OWC transmitter 602 may, at 622, transmit an OWC signal with a second DC bias parameter that is based on the DC bias feedback (received at 618). For instance, the OWC transmitter 602 may, at 620, select a DC bias value based on the DC bias feedback received at 618 and transmit the OWC signal using the selected DC bias value.

In some aspects, as part of 912, at 914, the OWC transmitter may transmit the OWC signal to the OWC receiver with a second AC parameter based on the AC power feedback from the OWC receiver. For example, referring to FIG. 6, the OWC transmitter 602 may, at 622, transmit the OWC signal to the OWC receiver 604 with a second AC parameter based on the AC power feedback from the OWC receiver (received at 618). For instance, the OWC transmitter 602 may, at 620, select an AC power value based on the AC bias feedback received at 618 and transmit the OWC signal using the selected AC power value (e.g., in addition to the selected DC bias value).

In some aspects, the OWC transmitter may be a network node, and the OWC receiver may be a UE. For example, referring to FIG. 6, the OWC transmitter 602 may be a network node (e.g., base station 102, 310; the CU 110, the DU 130; the RU 140; or the network entity 1302 in the hardware implementation of FIG. 13), and the OWC receiver 604 may be a UE (e.g., the UE 104, 350, or the apparatus 1204 in the hardware implementation of FIG. 12).

In some aspects, the OWC transmitter may be a UE, and the OWC receiver may be a network node. For example, referring to FIG. 6, the OWC transmitter 602 may be a UE (e.g., the UE 104, 350, or the apparatus 1204 in the hardware implementation of FIG. 12), and the OWC receiver 604 may be a network node (e.g., base station 102, 310; the CU 110, the DU 130; the RU 140; or the network entity 1302 in the hardware implementation of FIG. 13).

In some aspects, the OWC transmitter may be a first UE, and the OWC receiver may be a second UE. For example, referring to FIG. 6, the OWC transmitter 602 may be a first UE (e.g., the UE 104, 350, or the apparatus 1204 in the hardware implementation of FIG. 12), and the OWC receiver 604 may be a second UE (e.g., the UE 104, 350, or the apparatus 1204 in the hardware implementation of FIG. 12).

Figure 10:
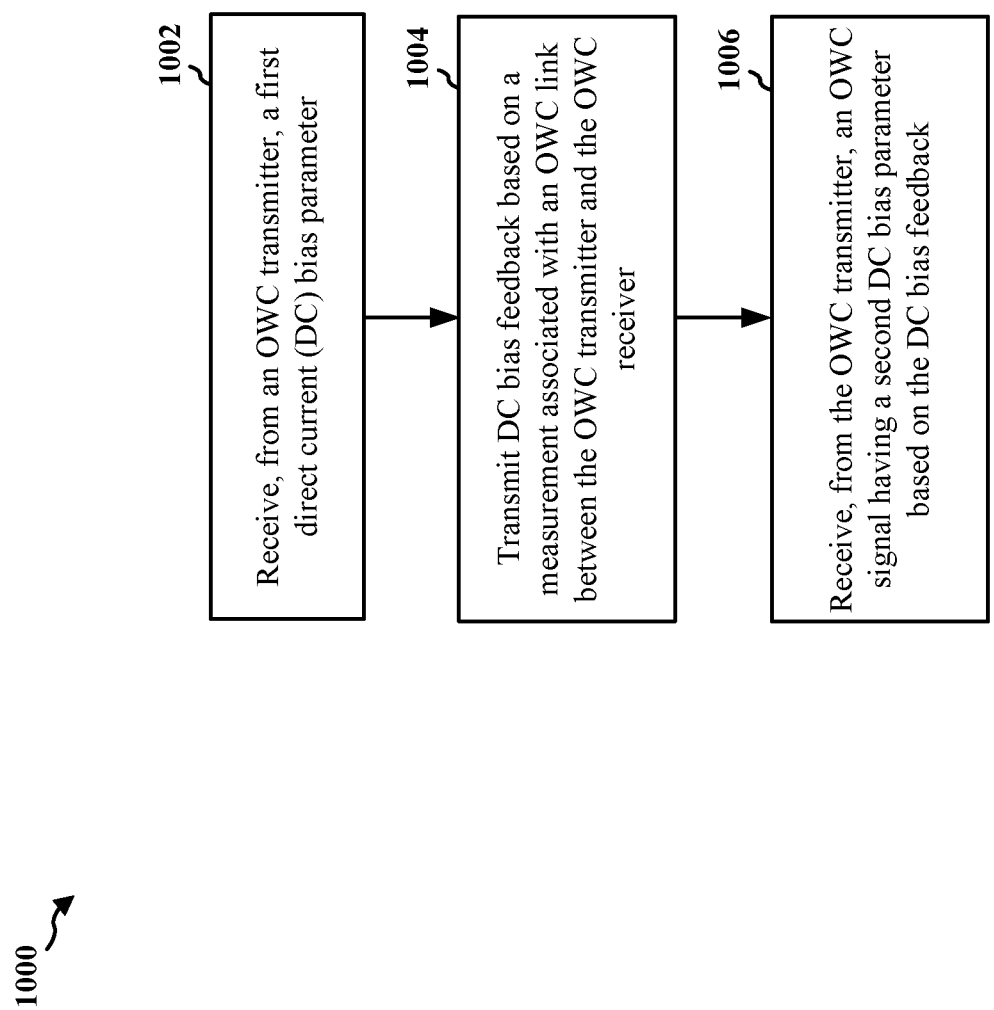
FIG. 10 is a flowchart illustrating methods of wireless communication at an OWC receiver in accordance with various aspects of the present disclosure.

FIG. 10 is a flowchart 1000 illustrating methods of wireless communication at an OWC receiver in accordance with various aspects of the present disclosure. In some aspects, the OWC receiver may be the OWC receiver 404 of FIG. 4 or the OWC receiver 604 of FIG. 6. In some aspects, the OWC receiver may be a network node. The network node may be a base station, or a component of a base station, in the access network of FIG. 1 or a core network component (e.g., base station 102, 310; the CU 110, the DU 130; the RU 140; or the network entity 1302 in the hardware implementation of FIG. 13). In other aspects, the OWC receiver may be a UE. The UE may be the UE 104, 350, or the apparatus 1204 in the hardware implementation of FIG. 12.

At 1002, the OWC receiver may receive, from an OWC transmitter, a first DC bias parameter. For example, referring to FIG. 6, the OWC receiver 604 may, at 610, receive a first DC bias parameter from the OWC transmitter 602. In an aspect in which the OWC receiver is a UE, 1002 may be performed by the DC bias/AC power determination component 198. In an aspect in which the OWC receiver is a network node, 1002 may be performed by the DC bias/AC power determination component 199.

In some aspects, the first DC bias parameter may include at least one of a DC bias value or a range of DC bias values. For example, referring to FIG. 6, the first DC bias parameter received at 610 may include at least one of a DC bias value (e.g., DC bias value 706, as shown in FIG. 7A) or a range of DC bias values (e.g., a range defined by minimum DC bias value 702 and maximum DC bias value 704, as shown in FIG. 7A).

In some aspects, the OWC receiver may receive the first DC bias parameter via level 3 signaling. For example, referring to FIG. 6, the OWC receiver 604 may, at 610, receive the first DC bias parameter to the OWC receiver 604 via level 3 signaling.

In some aspects, the OWC receiver may receive, from the OWC transmitter, AC power information including a first AC power parameter. For example, referring to FIG. 6, the OWC receiver 604 may, at 610, receive AC power information including a first AC power parameter from the OWC transmitter 602. In some aspects, the AC power information and the first DC bias parameter may be received via the same message. In other aspects, the AC power information and the first DC bias parameter may be received via different messages.

In some aspects, the AC power information may be included in level 3 signaling. For example, referring to FIG. 6, the OWC receiver 604 may, at 610, receive the AC power information from the OWC transmitter 602 via level 3 signaling.

At 1004, the OWC receiver may transmit DC bias feedback based on a measurement associated with an OWC link between the OWC transmitter and the OWC receiver. For example, referring to FIG. 6, the OWC receiver 604 may, at 618, transmit, to the OWC transmitter 602, DC bias feedback based on a measurement associated with the OWC signal received at 612. In an aspect in which the OWC receiver is a UE, 1004 may be performed by the DC bias/AC power determination component 198. In an aspect in which the OWC receiver is a network node, 1004 may be performed by the DC bias/AC power determination component 199.

In some aspects, the DC bias feedback may be indicated to the OWC transmitter via one of level 1 signaling or level 2 signaling. For example, referring to FIG. 6, the DC bias feedback transmitted at 618 to the OWC transmitter 602 may be indicated via one of level 1 signaling or level 2 signaling.

In some aspects, the DC bias feedback transmitted to the OWC transmitter may include an acknowledgement of reception of the first DC bias parameter. For example, referring to FIG. 6, the DC bias feedback transmitted at 618 to the OWC transmitter 602 may include an acknowledgement of reception of the first DC bias parameter at 610.

In some aspects, the DC bias feedback may include at least one of a DC bias value or a range of DC bias values. For example, referring to FIG. 6, the DC bias feedback transmitted at 618 may include at least one of a DC bias value (e.g., DC bias value 716, as shown in FIG. 7B) or a range of DC bias values (e.g., a range defined by the refined minimum DC bias value 712 and the refined maximum DC bias value 714, as shown in FIG. 7B).

In some aspects, the OWC receiver may transmit, to the OWC transmitter, AC power feedback. For example, referring to FIG. 6, the OWC receiver 604 may, at 618, transmit, to the OWC transmitter 602, AC power feedback. In some aspects, the AC power feedback and the DC bias feedback may be received via the same message. In other aspects, the AC power feedback and the DC bias feedback may be received via different messages.

In some aspects, the AC power feedback may be included in one of level 2 signaling or level 3 signaling. For example, referring to FIG. 6, the AC power feedback transmitted at 618 to the OWC transmitter 602 may be included in one of level 1signaling or level 2 signaling.

At 1006, the OWC receiver may receive an OWC signal with a second DC bias parameter that is based on the DC bias feedback. For example, referring to FIG. 6, the OWC receiver 604 may, at 622, receive an OWC signal with a second DC bias parameter that is based on the DC bias feedback. For instance, the OWC receiver 604 may, at 622, receive the OWC signal based on the DC bias value selected by the OWC transmitter 602 at 620. In an aspect in which the OWC receiver is a UE, 1006 may be performed by the DC bias/AC power determination component 198. In an aspect in which the OWC receiver is a network node, 1006 may be performed by the DC bias/AC power determination component 199.

In some aspects, the OWC receiver may receive the OWC signal from the OWC transmitter with a second AC parameter based on the AC power feedback. For example, referring to FIG. 6, the OWC receiver 604 may, at 622, receive the OWC signal from the OWC transmitter 602 with (e.g., based on) a second AC parameter based on the AC power feedback (transmitted at 618). For instance, the OWC transmitter 602 may, at 620, select an AC power value based on the AC bias feedback received at 618 and transmit the OWC signal to the OWC receiver 604 based on the selected AC power value (e.g., in addition to the selected DC bias value).

In some aspects, the OWC receiver may be a network node, and the OWC transmitter may be a UE. For example, referring to FIG. 6, the OWC receiver 604 may be a network node (e.g., base station 102, 310; the CU 110, the DU 130; the RU 140; or the network entity 1302 in the hardware implementation of FIG. 13), and the OWC transmitter 602 may be a UE (e.g., the UE 104, 350, or the apparatus 1204 in the hardware implementation of FIG. 12).

In some aspects, the OWC receiver may be a UE, and the OWC receiver may be a network node. For example, referring to FIG. 6, the OWC receiver 604 may be a UE (e.g., the UE 104, 350, or the apparatus 1204 in the hardware implementation of FIG. 12), and the OWC transmitter 602 may be a network node (e.g., base station 102, 310; the CU 110, the DU 130; the RU 140; or the network entity 1302 in the hardware implementation of FIG. 13).

In some aspects, the OWC receiver may be a first UE, and the OWC transmitter may be a second UE. For example, referring to FIG. 6, the OWC receiver 604 may be a first UE (e.g., the UE 104, 350, or the apparatus 1204 in the hardware implementation of FIG. 12), and the OWC transmitter 602 may be a second UE (e.g., the UE 104, 350, or the apparatus 1204 in the hardware implementation of FIG. 12).

Figure 11:
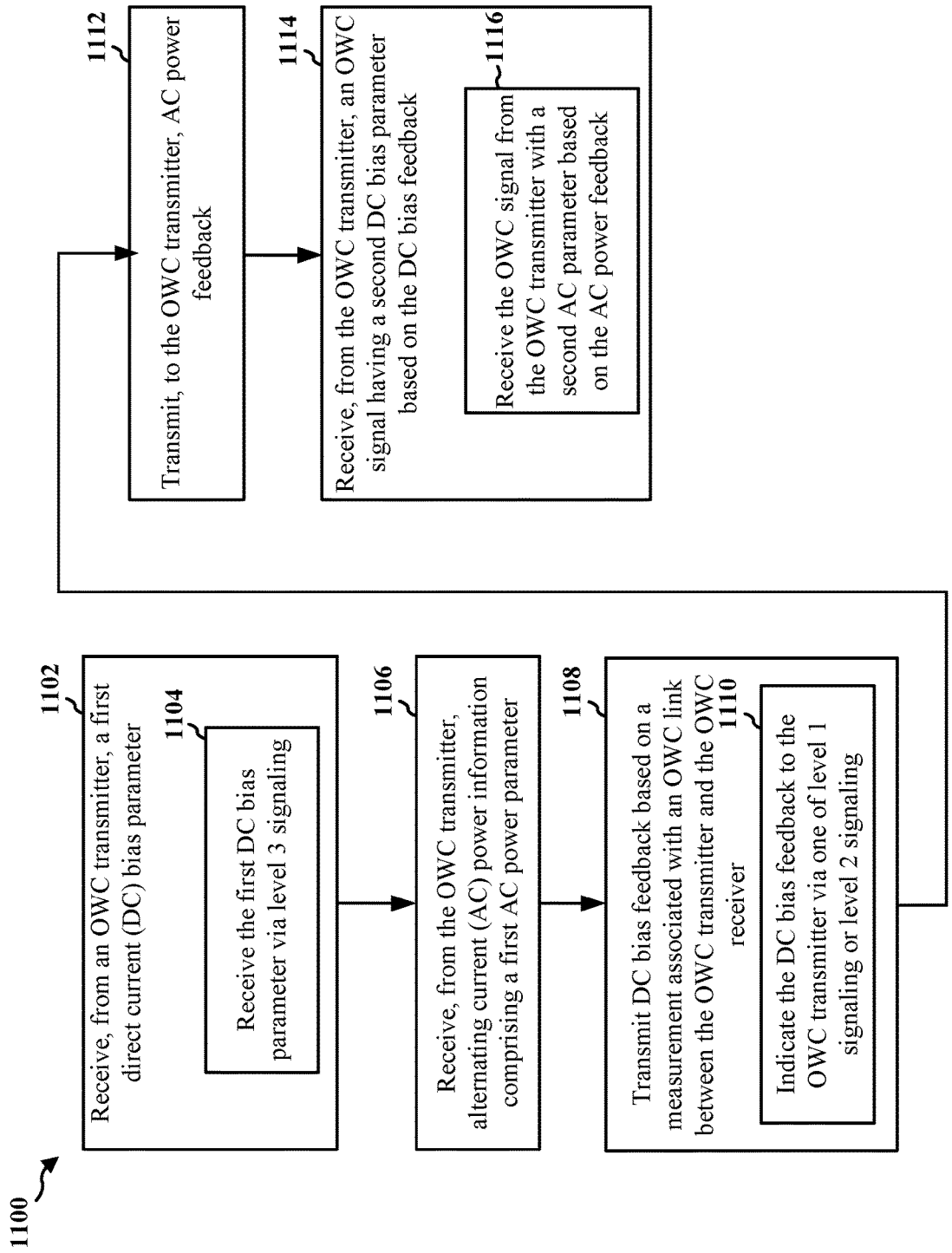
FIG. 11 is a flowchart illustrating methods of wireless communication at an OWC receiver in accordance with various aspects of the present disclosure.

FIG. 11 is a flowchart 1100 illustrating methods of wireless communication at an OWC receiver in accordance with various aspects of the present disclosure. In some aspects, the OWC receiver may be the OWC receiver 404 of FIG. 4 or the OWC receiver 604 of FIG. 6. In some aspects, the OWC receiver may be a network node. The network node may be a base station, or a component of a base station, in the access network of FIG. 1 or a core network component (e.g., base station 102, 310; the CU 110, the DU 130; the RU 140; or the network entity 1302 in the hardware implementation of FIG. 13). In other aspects, the OWC receiver may be a UE. The UE may be the UE 104, 350, or the apparatus 1204 in the hardware implementation of FIG. 12.

At 1102, the OWC receiver may receive, from an OWC transmitter, a first DC bias parameter. For example, referring to FIG. 6, the OWC receiver 604 may, at 610, receive a first DC bias parameter from the OWC transmitter 602.

In some aspects, as part of 1102, at 1104, the OWC receiver may receive the first DC bias parameter via level 3 signaling. For example, referring to FIG. 6, the OWC receiver 604 may, at 610, receive the first DC bias parameter to the OWC receiver 604 via level 3 signaling.

In some aspects, the first DC bias parameter may include at least one of a DC bias value or a range of DC bias values. For example, referring to FIG. 6, the first DC bias parameter received at 610 may include at least one of a DC bias value (e.g., DC bias value 706, as shown in FIG. 7A) or a range of DC bias values (e.g., a range defined by minimum DC bias value 702 and maximum DC bias value 704, as shown in FIG. 7A).

At 1106, the OWC receiver may receive, from the OWC transmitter, AC power information including a first AC power parameter. For example, referring to FIG. 6, the OWC receiver 604 may, at 610, receive AC power information including a first AC power parameter from the OWC transmitter 602. In some aspects, the AC power information and the first DC bias parameter may be received via the same message. In other aspects, the AC power information and the first DC bias parameter may be received via different messages.

In some aspects, the AC power information may be included in level 3 signaling. For example, referring to FIG. 6, the OWC receiver 604 may, at 610, receive the AC power information from the OWC transmitter 602 via level 3 signaling.

At 1108, the OWC receiver may transmit DC bias feedback based on a measurement associated with an OWC link between the OWC transmitter and the OWC receiver. For example, referring to FIG. 6, the OWC receiver 604 may, at 618, transmit, to the OWC transmitter 602, DC bias feedback based on a measurement associated with the OWC signal received at 612.

In some aspects, as part of 1108, at 1110, the DC bias feedback may be indicated to the OWC transmitter via one of level 1 signaling or level 2 signaling. For example, referring to FIG. 6, the DC bias feedback transmitted at 618 to the OWC transmitter 602 may be indicated via one of level 1 signaling or level 2 signaling.

In some aspects, the DC bias feedback transmitted to the OWC transmitter may include an acknowledgement of reception of the first DC bias parameter. For example, referring to FIG. 6, the DC bias feedback transmitted at 618 to the OWC transmitter 602 may include an acknowledgement of reception of the first DC bias parameter at 610.

In some aspects, the DC bias feedback may include at least one of a DC bias value or a range of DC bias values. For example, referring to FIG. 6, the DC bias feedback transmitted at 618 may include at least one of a DC bias value (e.g., DC bias value 716, as shown in FIG. 7B) or a range of DC bias values (e.g., a range defined by the refined minimum DC bias value 712 and the refined maximum DC bias value 714, as shown in FIG. 7B).

At 1112, the OWC receiver may transmit, to the OWC transmitter, AC power feedback. For example, referring to FIG. 6, the OWC receiver 604 may, at 618, transmit, to the OWC transmitter 602, AC power feedback. In some aspects, the AC power feedback and the DC bias feedback may be received via the same message. In other aspects, the AC power feedback and the DC bias feedback may be received via different messages.

In some aspects, the AC power feedback may be included in one of level 2 signaling or level 3 signaling. For example, referring to FIG. 6, the AC power feedback transmitted at 618 to the OWC transmitter 602 may be included in one of level 1 signaling or level 2 signaling.

At 1114, the OWC receiver may receive an OWC signal with a second DC bias parameter that is based on the DC bias feedback. For example, referring to FIG. 6, the OWC receiver 604 may, at 622, receive an OWC signal with a second DC bias parameter that is based on the DC bias feedback. For instance, the OWC receiver 604 may, at 622, receive the OWC signal based on the DC bias value selected at 620.

In some aspects, as part of 1114, at 1116, the OWC receiver may receive the OWC signal from the OWC transmitter with a second AC parameter based on the AC power feedback. For example, referring to FIG. 6, the OWC receiver 604 may, at 622, receive the OWC signal from the OWC transmitter 602 with (e.g., based on) a second AC parameter based on the AC power feedback (transmitted at 618). For instance, the OWC transmitter 602 may, at 620, select an AC power value based on the AC bias feedback received at 618 and transmit the OWC signal to the OWC receiver 604 based on the selected AC power value (e.g., in addition to the selected DC bias value).

Figure 12:
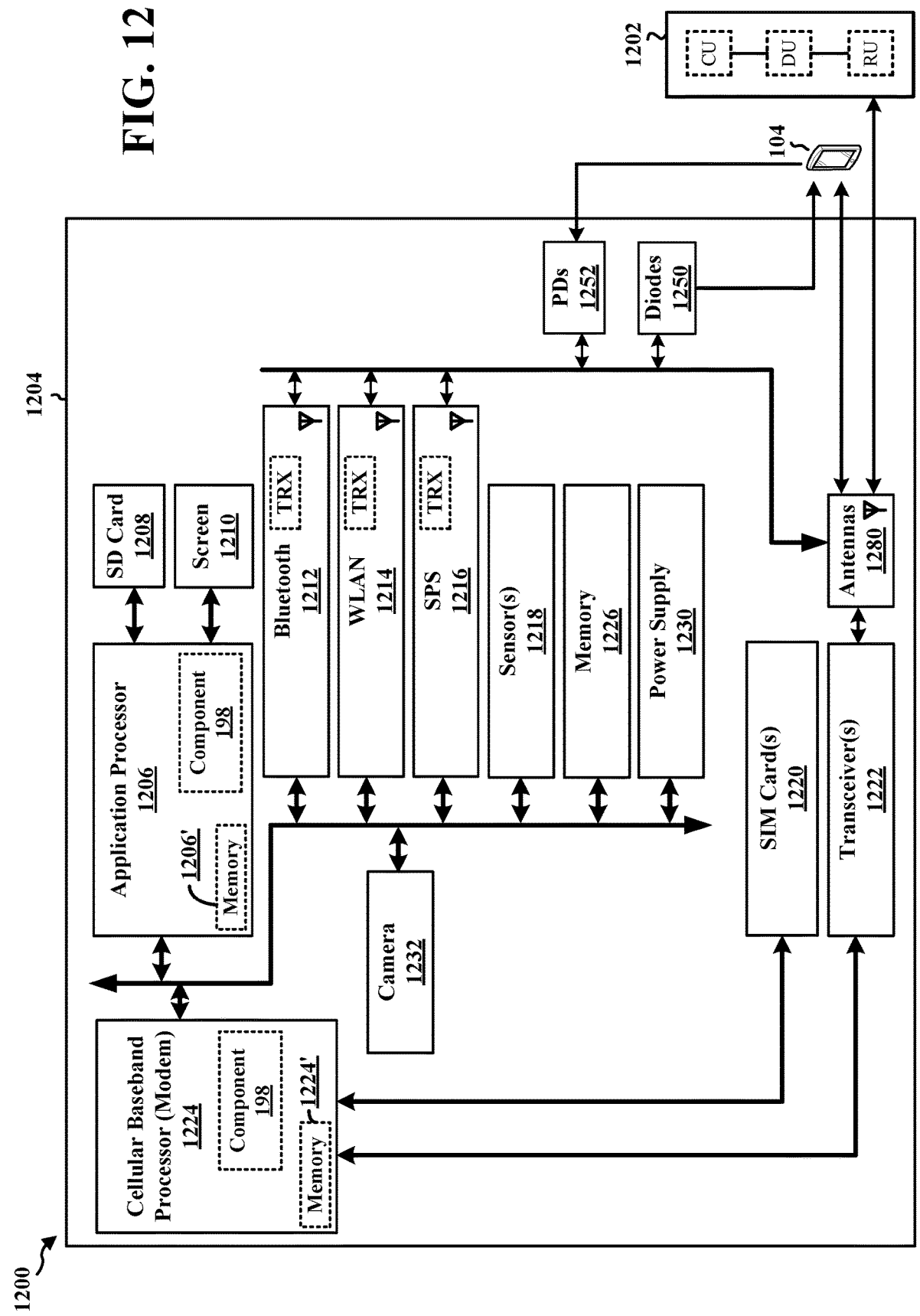
FIG. 12 is a diagram illustrating an example of a hardware implementation for an example apparatus and/or network entity.
Figure 13:
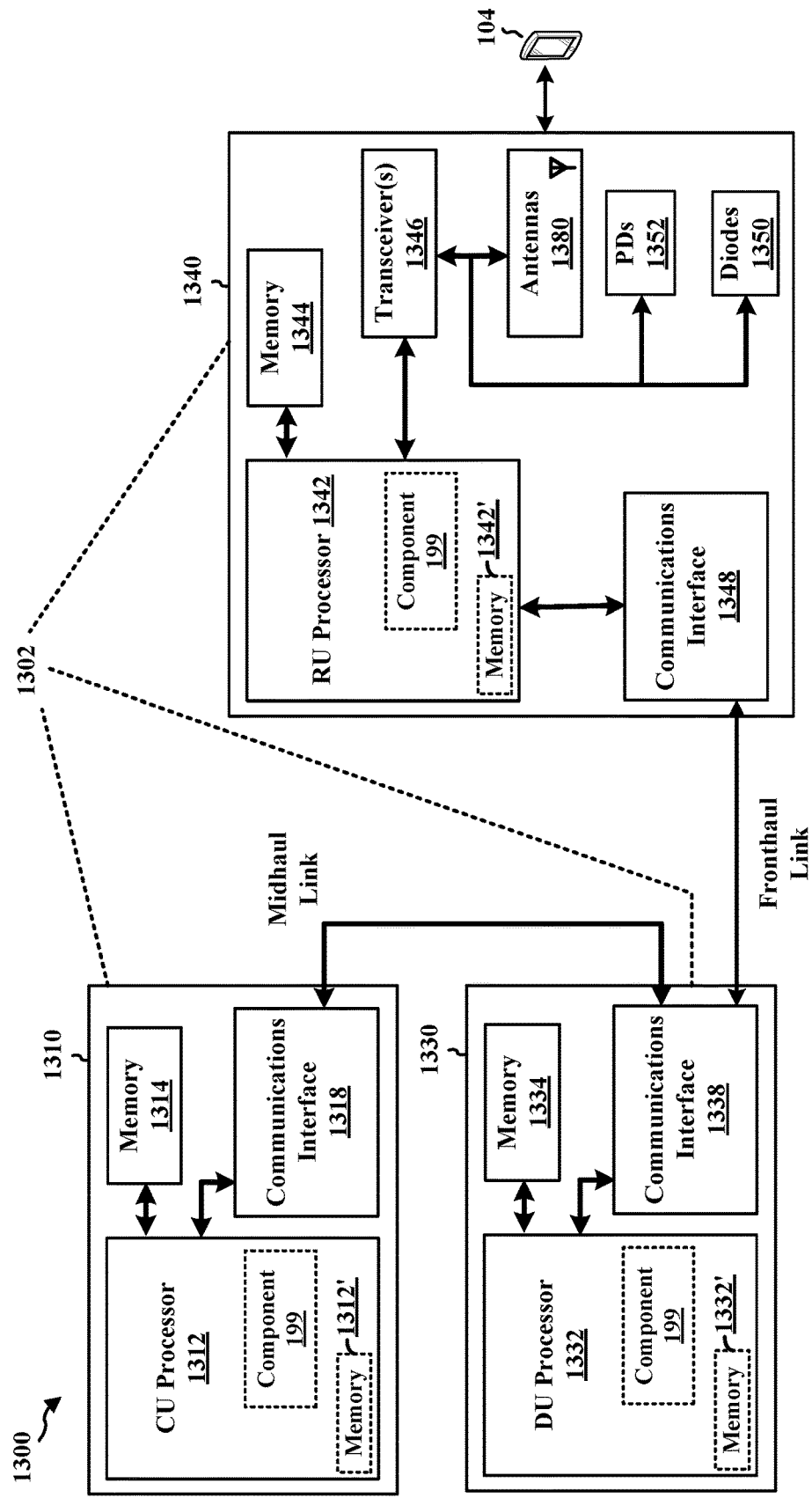
FIG. 13 is a diagram illustrating an example of a hardware implementation for an example network entity.

In some aspects, the OWC receiver may be a network node, and the OWC transmitter may be a UE. For example, referring to FIG. 6, the OWC receiver 604 may be a network node (e.g., base station 102, 310; the CU 110, the DU 130;

the RU 140; or the network entity 1302 in the hardware implementation of FIG. 13), and the OWC transmitter 602 may be a UE (e.g., the UE 104, 350, or the apparatus 1204 in the hardware implementation of FIG. 12).

In some aspects, the OWC receiver may be a UE, and the OWC receiver may be a network node. For example, referring to FIG. 6, the OWC receiver 604 may be a UE (e.g., the UE 104, 350, or the apparatus 1204 in the hardware implementation of FIG. 12), and the OWC transmitter 602 may be a network node (e.g., base station 102, 310; the CU 110, the DU 130; the RU 140; or the network entity 1302 in the hardware implementation of FIG. 13).

In some aspects, the OWC receiver may be a first UE, and the OWC transmitter may be a second UE. For example, referring to FIG. 6, the OWC receiver 604 may be a first UE (e.g., the UE 104, 350, or the apparatus 1204 in the hardware implementation of FIG. 12), and the OWC transmitter 602 may be a second UE (e.g., the UE 104, 350, or the apparatus 1204 in the hardware implementation of FIG. 12).

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas, dedicated diodes, dedicated photodetectors, and/or utilize the antennas 1280, diodes 1250 (e.g., laser diodes, LEDs, etc.), and photodetectors 1252 for communication. The cellular baseband processor 1224 communicates through the transceiver(s) 1222 via one or more antennas 1280, diodes 1250, and/or photodetectors 1252 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 may be configured to transmit, to an OWC receiver, a first DC bias parameter, to receive, from the OWC receiver, DC bias feedback based on a measurement associated with an OWC link between the OWC transmitter and the OWC receiver, and to transmit an OWC signal with a second DC bias parameter that is based on the DC bias feedback from the OWC receiver. The component 198 may also be configured to receive, from an OWC transmitter, a first DC bias parameter, to transmit DC bias feedback based on a measurement associated with an OWC link between the OWC transmitter and the OWC receiver, and to receive, from the OWC transmitter, an OWC signal having a second DC bias parameter based on the DC bias feedback. The component 198 may be further configured to perform any of the aspects described in connection with the flowchart in FIGS. 8-11 and/or the aspects performed by the OWC transmitter 602 and the OWC receiver 604 in the communication flow in FIG. 6. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for transmitting, to an OWC receiver, a first DC bias parameter, means for receiving, from the OWC receiver, DC bias feedback based on a measurement associated with an OWC link between the OWC transmitter and the OWC receiver, and means for transmitting an OWC signal with a second DC bias parameter that is based on the DC bias feedback from the OWC receiver. In another configuration, the apparatus 1204, and in particular the cellular baseband processor 1224 and/or the application processor 1206, may include means for receiving, from an OWC transmitter, a first DC bias parameter, means for transmitting DC bias feedback based on a measurement associated with an OWC link between the OWC transmitter and the OWC receiver, and means for receiving, from the OWC transmitter, an OWC signal having a second DC bias parameter based on the DC bias feedback. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, diodes 1350 (e.g., laser diodes, LEDs, etc.), photodetectors 1352, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, to an OWC receiver, a first DC bias parameter, to receive, from the OWC receiver, DC bias feedback based on a measurement associated with an OWC link between the OWC transmitter and the OWC receiver, and to transmit an OWC signal with a second DC bias parameter that is based on the DC bias feedback from the OWC receiver. The component 199 may also be configured to receive, from an OWC transmitter, a first DC bias parameter, to transmit DC bias feedback based on a measurement associated with an OWC link between the OWC transmitter and the OWC receiver, and to receive, from the OWC transmitter, an OWC signal having a second DC bias parameter based on the DC bias feedback. The component 199 may be further configured to perform any of the aspects described in connection with the flowchart in FIGS. 8-11 and/or the aspects performed by the OWC transmitter 602 and the OWC receiver 604 in the communication flow in FIG. 6. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for transmitting, to an OWC receiver, a first DC bias parameter, means for receiving, from the OWC receiver, DC bias feedback based on a measurement associated with an OWC link between the OWC transmitter and the OWC receiver, and means for transmitting an OWC signal with a second DC bias parameter that is based on the DC bias feedback from the OWC receiver. In another configuration, the network entity 1302 may include means for receiving, from an OWC transmitter, a first DC bias parameter, means for transmitting DC bias feedback based on a measurement associated with an OWC link between the OWC transmitter and the OWC receiver, and means for receiving, from the OWC transmitter, an OWC signal having a second DC bias parameter based on the DC bias feedback. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Various aspects relate generally to wireless communication and particularly to optical wireless communications (OWC). Some aspects more specifically relate to determining optimal operating characteristics or conditions (e.g., an optimal DC bias and/or an optimal alternating current (AC) power) for an OWC transmitter and an OWC receiver to optimize a link therebetween. In some examples, the OWC transmitter may initially select a DC bias and/or AC power (e.g., a default DC bias and/or AC power) to optimize its own transmission performance and signal the selected DC bias and/or AC power and/or an optimal DC bias range and/or AC power range to the OWC receiver. The OWC receiver may evaluate the selected DC bias and/or AC power range to determine how well the OWC receiver performs using the selected DC bias and/or AC power (e.g., in terms of shot noise) and may make a recommendation on a refined DC bias range and/or AC power range to the OWC transmitter. The OWC transmitter may select a DC bias and/or AC power from the refined DC bias range and/or refined AC power range based on the recommendation of the OWC receiver.

Particular aspects of the subject matter described in this disclosure can be implemented to realize one or more of the following potential advantages. In some examples, by utilizing a DC bias and/or AC power from the refined DC bias range and/or refined AC power range recommended by the OWC receiver, the described techniques ensure that OWC signals transmitted by the OWC transmitter result in relatively low shot noise and also drive the photodetector of the OWC receiver in its linear region, thereby avoiding non-linear distortion and reducing the degradation of the OWC signal link.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at an OWC transmitter, including: transmitting, to an OWC receiver, a first DC bias parameter; receiving, from the OWC receiver, DC bias feedback based on a measurement associated with an OWC link between the OWC transmitter and the OWC receiver; and transmitting an OWC signal with a second DC bias parameter that is based on the DC bias feedback from the OWC receiver.

Aspect 2 is the method of aspect 1, where the first DC bias parameter includes at least one of a DC bias value or a range of DC bias values.

Aspect 3 is the method of any of aspects 1 and 2, further including: indicating the first DC bias parameter to the OWC receiver via level 3 signaling.

Aspect 4 is the method of any of aspects 1 to 3, where the DC bias feedback from the OWC receiver is included (e.g., comprised) in one of level 1signaling or level 2 signaling.

Aspect 5 is the method of any of aspects 1 to 4, where the DC bias feedback from the OWC receiver includes an acknowledgement of reception of the first DC bias parameter.

Aspect 6 is the method of any of aspects 1 to 5, where the DC bias feedback from the OWC receiver includes at least one of a DC bias value or a range of DC bias values.

Aspect 7 is the method of any of aspects 1 to 6, further including: transmitting alternating current (AC) power information including a first AC power parameter to the OWC receiver.

Aspect 8 is the method of aspect 7, where the AC power information is included in level 3 signaling.

Aspect 9 is the method of any of aspects 1 to 8, further including: receiving, from the OWC receiver, AC power feedback; and transmitting the OWC signal to the OWC receiver with a second AC parameter based on the AC power feedback from the OWC receiver.

Aspect 10 is the method of aspect 9, where the AC power feedback is included in one of level 2 signaling or level 3 signaling.

Aspect 11 is the method of any of aspects 1 to 10, where the OWC transmitter is a network node and the OWC receiver is a UE.

Aspect 12 is the method of any of aspects 1 to 10, where the OWC transmitter is a UE and the OWC receiver is a network node.

Aspect 13 is the method of any of aspects 1 to 10, where the OWC transmitter is a first UE and the OWC receiver is a second UE.

Aspect 14 is a method of wireless communication at an OWC receiver, including: receiving, from an OWC transmitter, a first DC bias parameter; transmitting DC bias feedback based on a measurement associated with an OWC link between the OWC transmitter and the OWC receiver; and receiving, from the OWC transmitter, an OWC signal having a second DC bias parameter based on the DC bias feedback.

Aspect 15 is a method of aspect 14, where the first DC bias parameter includes at least one of a DC bias value or a range of DC bias values.

Aspect 16 is a method of any of aspects 14 and 15, where receiving, from the OWC transmitter, the first direct current (DC) bias parameter includes: receiving the first DC bias parameter via level 3 signaling.

Aspect 17 is a method of any of aspects 14 to 16, further including: indicating the DC bias feedback to the OWC transmitter via one of level 1signaling or level 2 signaling.

Aspect 18 is a method of any of aspects 14 to 17, where the DC bias feedback includes an acknowledgement of reception of the first DC bias parameter.

Aspect 19 is a method of any of aspects 14 to 18, where the DC bias feedback includes at least one of a DC bias value or a range of DC bias values.

Aspect 20 is a method of any of aspects 14 to 19, further including: receiving, from the OWC transmitter, alternating current (AC) power information including a first AC power parameter.

Aspect 21 is a method of aspect 20, where the AC power information is included in level 3 signaling.

Aspect 22 is a method of any of aspects 14 to 21, further including: transmitting, to the OWC transmitter, AC power feedback; and receiving the OWC signal from the OWC transmitter with a second AC parameter based on the AC power feedback.

Aspect 23 is a method of aspect 22, where the AC power feedback is transmitted via one of level 2 signaling or level 3 signaling.

Aspect 24 is a method of any of aspects 14 to 23, where the OWC transmitter is a network node and the OWC receiver is a UE.

Aspect 25 is a method of any of aspects 14 to 23, where the OWC transmitter is a UE and the OWC receiver is a network node.

Aspect 26 is a method of any of aspects 14 to 23, where the OWC transmitter is a first UE and the OWC receiver is a second UE.

Aspect 27 is an apparatus for wireless communication at a wireless device. The apparatus includes memory; and at least one processor coupled to the memory and, based at least in part on information stored in the memory, the at least one processor is configured to implement any of aspects 1 to 13.

Aspect 28 is the apparatus of aspect 27, further including at least one of a transceiver, an antenna, a diode, or a photodetector coupled to the at least one processor.

Aspect 29 is an apparatus for wireless communication at a wireless device. The apparatus includes memory; and at least one processor coupled to the memory and, based at least in part on information stored in the memory, the at least one processor is configured to implement any of aspects 14 to 26.

Aspect 30 is the apparatus of aspect 28, further including at least one of a transceiver, an antenna, a diode, or a photodetector coupled to the at least one processor.

Aspect 31 is an apparatus for wireless communication including means for implementing any of aspects 1 to 13.

Aspect 32 is an apparatus for wireless communication including means for implementing any of aspects 14 to 26.

Aspect 33 is a computer-readable medium (e.g., a non-transitory computer-readable medium) storing computer executable code, where the code when executed by a processor causes the processor to implement any of aspects 1 to 13.

Aspect 34 is a computer-readable medium (e.g., a non-transitory computer-readable medium) storing computer executable code, where the code when executed by a processor causes the processor to implement any of aspects 14 to 26.

What is claimed is:

1. An apparatus for wireless communication at an optical wireless communications (OWC) transmitter, comprising:
   memory; and
   at least one processor coupled to the memory and, based at least in part on information stored in the memory, the at least one processor is configured to:
   transmit, to an OWC receiver, a first direct current (DC) bias parameter;
   receive, from the OWC receiver, DC bias feedback based on a measurement associated with an OWC link between the OWC transmitter and the OWC receiver; and
   transmit an OWC signal with a second DC bias parameter that is based on the DC bias feedback from the OWC receiver.

2. The apparatus of claim 1, wherein the first DC bias parameter comprises at least one of a DC bias value or a range of DC bias values.

3. The apparatus of claim 1, wherein the at least one processor is further configured to:
   indicate the first DC bias parameter to the OWC receiver via level 3 signaling.

4. The apparatus of claim 1, wherein the DC bias feedback from the OWC receiver is comprised in one of level 1 signaling or level 2 signaling.

5. The apparatus of claim 1, wherein the DC bias feedback from the OWC receiver includes an acknowledgement of reception of the first DC bias parameter.

6. The apparatus of claim 1, wherein the DC bias feedback from the OWC receiver comprises at least one of a DC bias value or a range of DC bias values.

7. The apparatus of claim 1, wherein the at least one processor is further configured to:
   transmit alternating current (AC) power information comprising a first AC power parameter to the OWC receiver.

8. The apparatus of claim 7, wherein the AC power information is comprised in level 3 signaling.

9. The apparatus of claim 7, wherein the at least one processor is further configured to:
   receive, from the OWC receiver, AC power feedback; and
   transmit the OWC signal to the OWC receiver with a second AC parameter based on the AC power feedback from the OWC receiver.

10. The apparatus of claim 9, wherein the AC power feedback is comprised in one of level 2 signaling or level 3 signaling.

11. The apparatus of claim 1, wherein the OWC transmitter is a network node and the OWC receiver is a user equipment (UE).

12. The apparatus of claim 1, wherein the OWC transmitter is a UE and the OWC receiver is a network node.

13. The apparatus of claim 1, wherein the OWC transmitter is a first UE and the OWC receiver is a second UE.

14. An apparatus of wireless communication at an optical wireless communications (OWC) receiver, comprising:
   memory; and
   at least one processor coupled to the memory and, based at least in part on information stored in the memory, the at least one processor is configured to:
   receive, from an OWC transmitter, a first direct current (DC) bias parameter;
   transmit DC bias feedback based on a measurement associated with an OWC link between the OWC transmitter and the OWC receiver; and receive, from the OWC transmitter, an OWC signal having a second DC bias parameter based on the DC bias feedback.

15. The apparatus of claim 14, wherein the first DC bias parameter comprises at least one of a DC bias value or a range of DC bias values.

16. The apparatus of claim 14, wherein to receive, from the OWC transmitter, the first direct current (DC) bias parameter, the at least one processor is configured to:
receive the first DC bias parameter via level 3 signaling.

17. The apparatus of claim 14, wherein the at least one processor is further configured to:
indicate the DC bias feedback to the OWC transmitter via one of level 1 signaling or level 2 signaling.

18. The apparatus of claim 14, wherein the DC bias feedback includes an acknowledgement of reception of the first DC bias parameter.

19. The apparatus of claim 14, wherein the DC bias feedback comprises at least one of a DC bias value or a range of DC bias values.

20. The apparatus of claim 14, wherein the at least one processor is further configured to:
receive, from the OWC transmitter, alternating current (AC) power information comprising a first AC power parameter.

21. The apparatus of claim 20, wherein the AC power information is comprised in level 3 signaling.

22. The apparatus of claim 20, wherein the at least one processor is further configured to:
transmit, to the OWC transmitter, AC power feedback; and
receive the OWC signal from the OWC transmitter with a second AC parameter based on the AC power feedback.

23. The apparatus of claim 22, wherein the AC power feedback is transmitted via one of level 2 signaling or level 3 signaling.

24. The apparatus of claim 14, wherein the OWC transmitter is a network node and the OWC receiver is a user equipment (UE).

25. The apparatus of claim 14, wherein the OWC transmitter is a UE and the OWC receiver is a network node.

26. The apparatus of claim 14, wherein the OWC transmitter is a first UE and the OWC receiver is a second UE.

27. A method of wireless communication at an optical wireless communications (OWC) transmitter, comprising:
transmitting, to an OWC receiver, a first direct current (DC) bias parameter;
receiving, from the OWC receiver, DC bias feedback based on a measurement associated with an OWC link between the OWC transmitter and the OWC receiver; and
transmitting an OWC signal with a second DC bias parameter that is based on the DC bias feedback from the OWC receiver.

28. The method of claim 27, further comprising:
transmitting alternating current (AC) power information comprising a first AC power parameter to the OWC receiver.

29. A method of wireless communication at an optical wireless communications (OWC) receiver, comprising:
receiving, from an OWC transmitter, a first direct current (DC) bias parameter;
transmitting DC bias feedback based on a measurement associated with an OWC link between the OWC transmitter and the OWC receiver; and
receiving, from the OWC transmitter, an OWC signal having a second DC bias parameter based on the DC bias feedback.

30. The method of claim 29, further comprising:
receiving, from the OWC transmitter, alternating current (AC) power information comprising a first AC power parameter.

* * * * *